(12) United States Patent
Kim et al.

(10) Patent No.: US 11,666,980 B2
(45) Date of Patent: Jun. 6, 2023

(54) WORK HARDENED WELDS AND METHODS FOR SAME

(71) Applicant: Webco Industries, Inc., Sand Springs, OK (US)

(72) Inventors: Yong Joo Kim, Tulsa, OK (US); Stephen Douglas Obermark, Tulsa, OK (US); Brent Michael Summers, Tulsa, OK (US); Austin Tyler Hanes, Mounds, OK (US); William Francis Obermark, Sand Springs, OK (US)

(73) Assignee: Webco Industries, Inc., Sand Springs, OK (US)

( * ) Notice: Subject to any disclaimer, the term of this patent is extended or adjusted under 35 U.S.C. 154(b) by 178 days.

(21) Appl. No.: 17/327,812

(22) Filed: May 24, 2021

(65) Prior Publication Data

US 2021/0293359 A1 Sep. 23, 2021

Related U.S. Application Data

(63) Continuation of application No. 16/485,618, filed as application No. PCT/US2018/017971 on Feb. 13, 2018, now Pat. No. 11,014,181.

(Continued)

(51) Int. Cl.
*B23K 9/028* (2006.01)
*B23K 9/23* (2006.01)
(Continued)

(52) U.S. Cl.
CPC .............. *B23K 9/0282* (2013.01); *B23K 9/23* (2013.01); *C21D 7/10* (2013.01); *C21D 9/08* (2013.01);
(Continued)

(58) Field of Classification Search
CPC .. B23K 9/0282; B23K 9/0284; B23K 9/0286; B23K 9/167; B23K 9/23; B23K 33/004;
(Continued)

(56) References Cited

U.S. PATENT DOCUMENTS

| 1,997,538 A | 4/1935 | Armstrong |
| 2,415,987 A | 2/1947 | Bissout et al. |

(Continued)

FOREIGN PATENT DOCUMENTS

| CA | 3052815 | 11/2021 |
| JP | S58107292 | 6/1983 |

(Continued)

OTHER PUBLICATIONS

"U.S. Appl. No. 62/458,507 Preliminary Amendment filed Jul. 12, 2017", 3 pgs.

(Continued)

*Primary Examiner* — Josh Skroupa
(74) *Attorney, Agent, or Firm* — Schwegman Lundberg & Woessner, P.A.

(57) ABSTRACT

A tube assembly includes at least first and second tubes configured for coupling at respective ends. The first and second tubes each include a base material, and a weld interface at the respective end. The weld interface is proximate to an inner diameter and an outer diameter of the first and second tubes, and includes a weld interface segment extending therebetween. A work hardened weld assembly couples the base material of each of the first and second tubes. The work hardened weld assembly includes a weld fusion zone between the weld interfaces of the first and second tubes and the weld interface segments of the first and second tubes. The weld fusion zone is work hardened and at least the weld interface segments of the first and second tubes are work hardened between the work hardened weld (Continued)

fusion zone and the base material of the first and second tubes.

40 Claims, 12 Drawing Sheets

Related U.S. Application Data

(60) Provisional application No. 62/485,645, filed on Apr. 14, 2017, provisional application No. 62/458,507, filed on Feb. 13, 2017.

(51) Int. Cl.
*C21D 7/10* (2006.01)
*C21D 9/08* (2006.01)
*C21D 9/50* (2006.01)
*C22F 1/10* (2006.01)
*F16L 13/02* (2006.01)
*B23K 103/18* (2006.01)
*B23K 103/04* (2006.01)
*B23K 101/06* (2006.01)
*B23K 101/10* (2006.01)

(52) U.S. Cl.
CPC .............. *C21D 9/50* (2013.01); *C22F 1/10* (2013.01); *F16L 13/02* (2013.01); *B23K 2101/06* (2018.08); *B23K 2101/10* (2018.08); *B23K 2103/04* (2018.08); *B23K 2103/26* (2018.08); *C21D 2221/00* (2013.01)

(58) Field of Classification Search
CPC .............. B23K 33/006; B23K 2101/06; B23K 2101/10; B23K 2103/04; C21D 9/08; C21D 9/50; C21D 2221/00; F16B 5/05; F16L 13/02; Y10T 403/477; Y10T 403/478; Y10T 403/479
USPC ........................................ 403/270, 271, 272
See application file for complete search history.

(56) References Cited

U.S. PATENT DOCUMENTS

| | | | |
|---|---|---|---|
| 3,030,482 | A | 4/1962 | Kennedy, Jr. |
| 3,077,170 | A | 2/1963 | Parlasca |
| 3,486,219 | A | 12/1969 | Davies et al. |
| 3,997,374 | A | 12/1976 | Dill et al. |
| 4,049,186 | A | 9/1977 | Hanneman et al. |
| 4,178,022 | A * | 12/1979 | Hanneman .............. F16L 13/04 138/155 |
| 4,491,001 | A | 1/1985 | Yoshida et al. |
| 4,649,256 | A | 3/1987 | Minamida et al. |
| 5,201,457 | A | 4/1993 | Kitayama et al. |
| 5,258,600 | A | 11/1993 | Arthur |
| 6,076,725 | A | 6/2000 | Imamura et al. |
| 6,337,147 | B1 | 1/2002 | Haszler et al. |
| 6,689,231 | B1 | 2/2004 | Kangas |
| 6,880,220 | B2 | 4/2005 | Gandy |
| 9,208,926 | B2 | 12/2015 | Chartier |
| 9,308,600 | B2 | 4/2016 | Hassel et al. |
| 9,339,886 | B2 | 5/2016 | Bowers |
| 11,014,181 | B2 | 5/2021 | Kim et al. |
| 11,339,900 | B2 | 5/2022 | Kim et al. |
| 2002/0134452 | A1 | 9/2002 | Fairchild et al. |
| 2004/0200881 | A1 | 10/2004 | Gandy |
| 2004/0244882 | A1 | 12/2004 | Lobanov et al. |
| 2004/0250584 | A1 | 12/2004 | Offer |
| 2007/0119829 | A1 | 5/2007 | Vietz et al. |
| 2010/0006545 | A1 | 1/2010 | Sisak et al. |
| 2011/0107571 | A1 | 5/2011 | Kerdiles et al. |
| 2011/0155289 | A1 | 6/2011 | Iwamatsu |
| 2013/0092670 | A1 | 4/2013 | Hassel et al. |
| 2014/0060873 | A1 | 3/2014 | Chartier |
| 2015/0258629 | A1 | 9/2015 | Radis et al. |
| 2016/0375518 | A1 | 12/2016 | Revel-muroz et al. |
| 2017/0000081 | A1 | 1/2017 | Betts-lacroix et al. |
| 2017/0008117 | A1 | 1/2017 | Siefert et al. |
| 2019/0381594 | A1 | 12/2019 | Kim et al. |
| 2020/0114454 | A1 | 4/2020 | Kim et al. |

FOREIGN PATENT DOCUMENTS

| | | |
|---|---|---|
| JP | S60221190 | 11/1985 |
| JP | 0211269 | 1/1990 |
| JP | H06264478 | 9/1994 |
| JP | H08243753 | 9/1996 |
| JP | H1133771 | 2/1999 |
| JP | 2004244882 | 9/2004 |
| JP | 2004330300 | 11/2004 |
| JP | 4309830 | 5/2009 |
| JP | 2020506064 | 2/2020 |
| JP | 6744500 | 8/2020 |
| RU | 2251465 | 5/2005 |
| WO | 2018148718 | 8/2018 |
| WO | 2021119191 | 6/2021 |

OTHER PUBLICATIONS

"U.S. Appl. No. 62/485,645 Preliminary Amendment filed Jul. 12, 2017", 3 pgs.
"International Application Serial No. PCT US2018 017971, International Search Report dated May 4, 2018", 2 pgs.
"International Application Serial No. PCT US2018 017971, Written Opinion dated May 4, 2018", 9 pgs.
"Canadian Application Serial No. 3,052,815, Examiner's Rule 30(2) Requisition dated Oct. 16, 2019", 12 pgs.
"U.S. Appl. No. 16/485,618 Supplemental Preliminary Amendment filed Oct. 23, 2019", 11 pgs.
"Korean Application Serial No. 10-2019-7026427, Notice of Preliminary Rejection dated Nov. 14, 2019", W English Translation, 4 pgs.
"Korean Application Serial No. 10-2019-7026427, Response filed Jan. 10, 2020 to Notice of Preliminary Rejection dated Nov. 14, 2019", w English Claims, 33 pgs.
"Japanese Application Serial No. 2019-543752, Notification of Reasons for Refusal dated Mar. 10, 2020", w English Translation, 10 pgs.
"European Applicatioin Serial No. 18752029.1, Response filed Mar. 30, 2020 to Communication Pursuant to Rules 161(1) and 162 EPC dated Sep. 20, 2019", 18 pgs.
"Canadian Application Serial No. 3,052,815, Response filed Apr. 16, 2020 to Examiner's Rule 30(2) Requisition dated Oct. 16, 2019", 41 pgs.
"Japanese Application Serial No. 2019-543752, Response filed Jun. 5, 2020 to Notification of Reasons for Refusal dated Mar. 10, 2020", w English Claims, 22 pgs.
"U.S. Appl. No. 16/485,618, Restriction Requirement dated Aug. 6, 2020", 6 pgs.
"U.S. Appl. No. 16/485,618, Response filed Aug. 13, 2020 to Restriction Requirement dated Aug. 6, 2020", 11 pgs.
"U.S. Appl. No. 16/485,618, Non Final Office Action dated Aug. 25, 2020", 17 pgs.
"Canadian Application Serial No. 3,052,815, Office Action dated Oct. 5, 2020", 9 pgs.
"U.S. Appl. No. 16/485,618, Response filed Dec. 28, 2020 to Non Final Office Action dated Aug. 25, 2020", 14 pgs.
"U.S. Appl. No. 16/485,618, Notice of Allowance dated Jan. 19, 2021", 8 pgs.
"Canadian Application Serial No. 3,052,815, Response filed Jan. 28, 2021 to Office Action dated Oct. 5, 2020", 24 pgs.
"International Application Serial No. PCT US2020 064104, International Search Report dated Mar. 3, 2021", 2 pgs.
"International Application Serial No. PCT US2020 064104, Written Opinion dated Mar. 3, 2021", 7 pgs.

(56) References Cited

OTHER PUBLICATIONS

"U.S. Appl. No. 16/485,618, Corrected Notice of Allowability dated Mar. 24, 2021", 4 pgs.
"European Application Serial No. 18752029.1, Extended European Search Report dated Mar. 26, 2021", 8 pgs.
"U.S. Appl. No. 16/485,618, Corrected Notice of Allowability dated Apr. 27, 2021", 4 pgs.
"Mexican Application Serial No. MX a 2019 009664, Office Action dated Jun. 3, 2021", w English Translation, 9 pgs.
"Brazilian Application Serial No. BR112019016694-7, Opinion for non-patenteability (RPI 7.1) dated Jul. 1, 2021", w English Translation, 17 pgs.
"U.S. Appl. No. 16/712,683, Notice of Allowance dated Mar. 28, 2022", 7 pgs.
"European Application Serial No. 18752029.1, Response Filed Jun. 8, 2022 to Communication Pursuant to Article 94(3) EPC dated Jan. 31, 2022", 12 pgs.
"U.S. Appl. No. 16/712,683, Non Final Office Action dated Nov. 19, 2021", 14 pgs.
"International Application Serial No. PCT US2020 064104, Response to Written Opinion filed Oct. 12, 2021 to Written Opinion dated Mar. 3, 2021", 22 pgs.
"International Application Serial No. PCT US2020 064104, International Preliminary Report on Patentability dated Nov. 19, 2021", 9 pgs.
"Brazilian Application Serial No. BR112019016694-7, Office Action dated Nov. 16, 2021", w English translation, 11 pgs.
"European Application Serial No. 18752029.1, Communication Pursuant to Article 94(3) EPC dated Jan. 31, 2022", 4 pgs.
"U.S. Appl. No. 16/712,683, Examiner Interview Summary dated Mar. 4, 2022", 2 pgs.
"U.S. Appl. No. 16/712,683, Response filed Mar. 15, 2022 to Non Final Office Action dated Nov. 19, 2021", 16 pgs.
Kozij, "Specification Translation of RU 2251465", Stud Production Method, (May 10, 2005), 5 pgs.
"Canadian Application Serial No. 3,134,247, Examiner's Rule 86(2) Requisition dated Dec. 13, 2022", 6 pgs.
"European Application Serial No. 18752029.1, Response Filed Mar. 31, 2023 to Communication under Rule 71(3) EPC dated Nov. 23, 2023", 13 pgs.

* cited by examiner

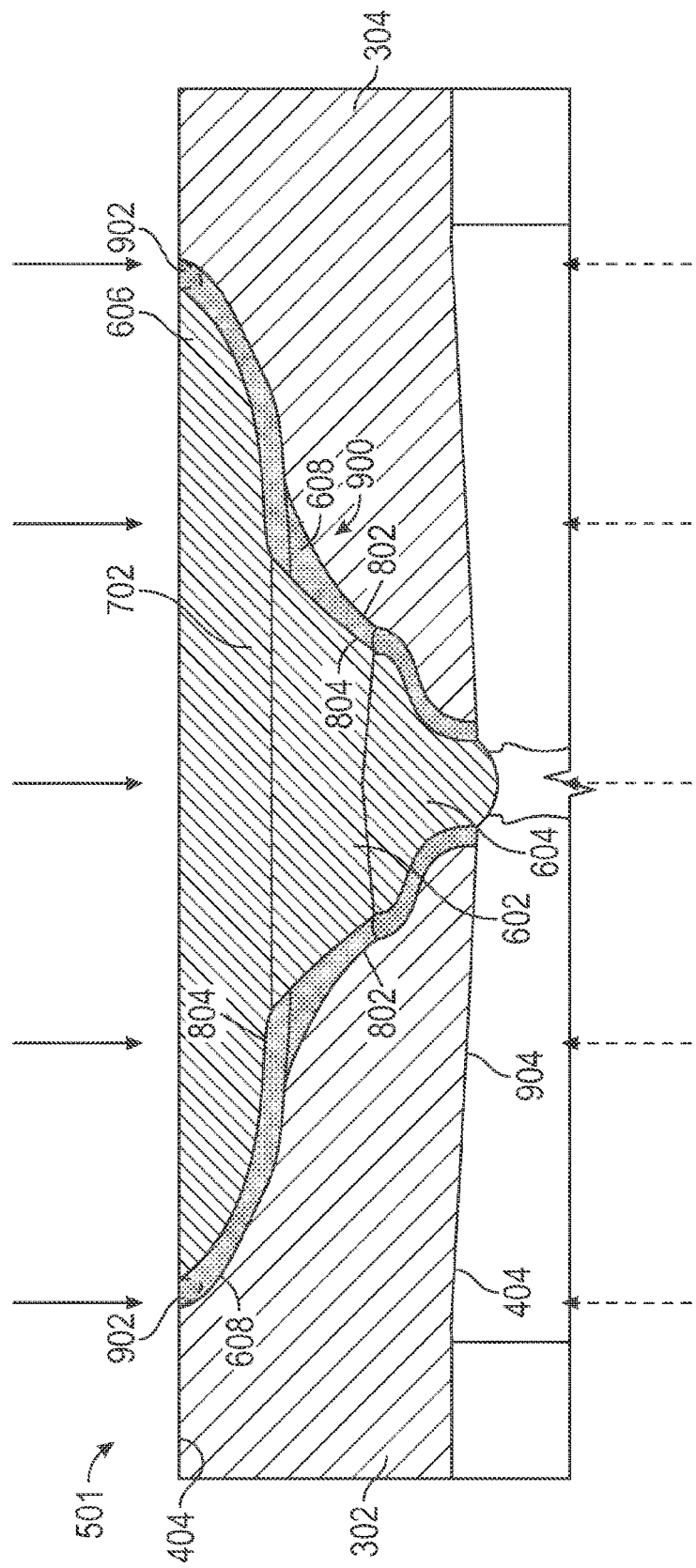

WORK HARDENED WELDS AND METHODS FOR SAME

RELATED APPLICATIONS

This application is a continuation of U.S. patent application Ser. No. 16/485,618, filed Aug. 13, 2019, which application is a U.S. National State Filing under 35 U.S.C. 371 from International Patent Application Serial No. PCT/US2018/017971, filed Feb. 13, 2018, published on Aug. 16, 2018 as WO 2018/148718 A1, which application claims the benefit of priority to both U.S. Provisional Application Ser. No. 62/485,645, filed Apr. 14, 2017 and U.S. Provisional Application Ser. No. 62/458,507, filed Feb. 13, 2017, the contents of which are incorporated herein by reference in their entireties.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Webco Industries, Inc.; Sand Springs, Okla. All Rights Reserved.

TECHNICAL FIELD

This document pertains generally, but not by way of limitation, to metal components, such as pipes, tubes and the like and connections therebetween.

BACKGROUND

High strength tubes, pipes or the like (e.g., metal components) are used in a variety of applications because of their strength including yield strength, ultimate (tensile) strength, high fatigue life and the like. Further, in some applications tubes, pipes or the like are used in corrosive conditions including undersea or subterranean environments, mining, gas or oil production or the like. Metal components, such as stainless steel and nickel alloys are suited in some examples for use in these environments and also, when conditioned, provide a high strength component.

Metal components, in some examples, are welded to join components and enclose other components or form larger assemblies. In examples, welding uses a heat source to melt and join components. The component material is melted and then joined, for instance with a filler metal. One example of a welded assembly includes umbilicals used in offshore oil and gas production. The umbilical includes tubular segments that are connected by way of orbital welds and helically wound or bundled together with other components to form a wrapped and continuous unit that is encased in a jacket and extends to one or more pieces of equipment in the aquatic environment. The umbilical provides one or more of fluids, power, information (e.g., instructions, data streams or the like) to and from the pieces of equipment.

Overview

The present inventors have recognized, among other things, that a problem to be solved includes minimizing the decrease in strength and corresponding weak point of welded components because of localized heating (annealing) of the base material (e.g., stainless steel, nickel based alloys or the like) proximate to welds. The metal components used in a variety of applications are, in some examples, conditioned (e.g., heat treated, cold worked and the like) to achieve specified mechanical characteristics including, but not limited to, one or more of yield strength, ultimate (tensile) strength, hardness and fatigue life. Further, these components are conditioned to provide high strength while at the same time maintaining ductility for formation of specified profiles and shapes when subjected to the appropriate tensile stress.

One example of a conditioning technique for metal components includes work hardening (e.g., cold working or cold rolling). In work hardening the metal component such as a sheet or the like is plastically deformed and thereby increases the strength of the material (e.g., including one or more of yield strength, ultimate strength, hardness, fatigue life or the like).

Further, welding of components, including melting of the base material (such as stainless steel or nickel based alloys) anneals the base material proximate to the weld and creates a relatively weaker location in the assembly relative to the remainder of the base material. The weaker location contains both as-cast weld structure and a local heat affected zone (HAZ), a partially annealed form of the base material, both of which lack the strength of the base material (e.g., one or more yield or ultimate strength, hardness, fatigue life or the like). Because the weld and the HAZ extend through the components (e.g., from proximate an exterior surface to proximate an interior surface, or outside and inside diameters) work hardening of the weld assembly, for instance the weld fusion zone (e.g., including one or more of a weld filler, resolidified, weld-cast, as-cast, re-cast base material or the like), does not sufficiently modify the material structure of the HAZ consistently to increase the strength of the overall weld assembly proximate to the original strength of the base material. Accordingly, a weak location is formed that is prone to failure because of its lower strength relative to the base material of the components (e.g., tubes, pipes or the like).

The present subject matter helps provide a solution to this problem, such as by constructing and work hardening a weld assembly in a consistent and predictable manner that provides a higher strength connection between components. As described herein the weld assembly includes mechanical characteristics including, but not limited to, one or more of yield strength, ultimate (tensile) strength, hardness, fatigue life or the like proximate (e.g., matching or within 8000 psi or less of a specified yield strength) to the corresponding mechanical characteristics of the base material. In one example, the weld assemblies described herein provide a yield strength of 90,000 psi or greater, for instance with a base material including a nickel alloy.

In one example, the weld assembly is a component of a tube assembly and includes at least a first tube and a second tube configured for coupling at respective ends. Each of the first and second tubes include a base material having a specified strength, and a weld interface at the respective ends. When the tubes are fused into a welded assembly, the weld interfaces are annealed as described herein. The weld assembly including a weld fusion zone (e.g., one or more of a weld filler, resolidified, weld-cast, as-cast, re-cast base material or the like) is constructed, and each of the weld fusion zone and the weld interfaces including HAZ are work hardened, for instance between upper and lower surfaces, outside and inside diameters or the like to consistently and predictably increase the overall strength of the weld assembly.

In one example, the weld interfaces are formed into a weld bed that extends laterally from a bed root (e.g., weld root proximate an inside diameter) to a bed opening (e.g., weld opening proximate an outside diameter). The recess formed by the weld bed is filled with a weld fusion zone (e.g., molten base material with or without molten weld filler material that resolidifies). The HAZ is formed in the weld interfaces through annealing of the base material caused by the weld fusion zone. The HAZ and weld interfaces are, in this example, shaped to position the HAZ in a position relatively beneath the weld fusion zone. The weld fusion zone is work hardened and is plastically deformed in the direction of the annealed weld interfaces (e.g., HAZ). The plastically deformed weld fusion zone is driven into the shaped weld interfaces (e.g., laterally shaped) by the work hardening and the interfaces are correspondingly work hardened between the bed root and the bed opening. The weld fusion zone is provided over the laterally extending weld bed (including the weld interfaces) while a non-annealed portion of the components including the base material is beneath the weld bed. The base material (and optionally a mandrel or support plate) supports the weld bed during work hardening, and work hardening of the weld fusion zone is conducted along one or more vectors extending through the weld fusion zone and into the weld bed. In contrast to vertical or steep weld interfaces, the shaped weld interfaces position the HAZ beneath the weld fusion zone and accordingly reveal the HAZ for plastic deformation through work hardening of the overlying weld fusion zone (e.g., along the vectors used for work hardening). Vertical or steep orienting of the HAZ that isolates lower portions of the HAZ under upper portions of the HAZ is thereby minimized, and instead the shaped weld interfaces including the similarly shaped lateral HAZ are consistently and reliably work hardened.

In another example, the components, such as first and second tubes have end profiles different from an overall profile of the remainder of the first and second tubes. In this welding configuration the first and second tubes are joined at their respective ends having the end profiles with a weld fusion zone (e.g., one or more of a weld filler, resolidified, weld-cast, as-cast, re-cast base material or the like). The weld assembly including the weld fusion zone, the annealed weld interfaces created by welding and the first and second tubes proximate the interfaces (e.g., having the end profile) are then work hardened through deformation of the tubes. Deformation of the components includes deforming respective ends having the end profile until it matches the overall profile of the remainder of the tubes (e.g., deforming from an expanded profile to a specified tube profile). The deformation of each of the respective ends, the weld interfaces and the weld fusion zone work hardens the weld assembly.

In each of the examples provided herein the weld assemblies are work hardened to provide a high strength connection between one or more high strength components. Accordingly assemblies, such as umbilicals, work strings or the like are assembled with a consistent and predictable set of mechanical characteristics including, but not limited to, one or more of yield strength, ultimate strength, hardness or fatigue life while maintaining a specified ductility. For instance, work hardened weld assemblies and work hardening techniques as described herein provide welds having strength proximate the strength of the work hardened base material (e.g., within 1000 psi or less, 2000 psi or less, 4000 psi or less, 8000 psi or less yield strength; in contrast to a variation in yield strength of about 30,000 psi or more between annealed and non-annealed work hardened base materials).

This overview is intended to provide an overview of subject matter of the present patent application. It is not intended to provide an exclusive or exhaustive explanation of the disclosure. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 7A-1 is a detailed cross sectional view of the tube assembly of FIG. 6 with a weld fusion zone within the tapered weld recess.

FIG. 7A-2 is a detailed cross sectional view of the tube assembly of FIG. 6 with a weld fusion zone within the tapered weld recess.

FIG. 9 is a detailed cross sectional view of the tube assembly of FIG. 8 including a weld assembly in another example of a work hardened configuration.

DETAILED DESCRIPTION

Figure 1:
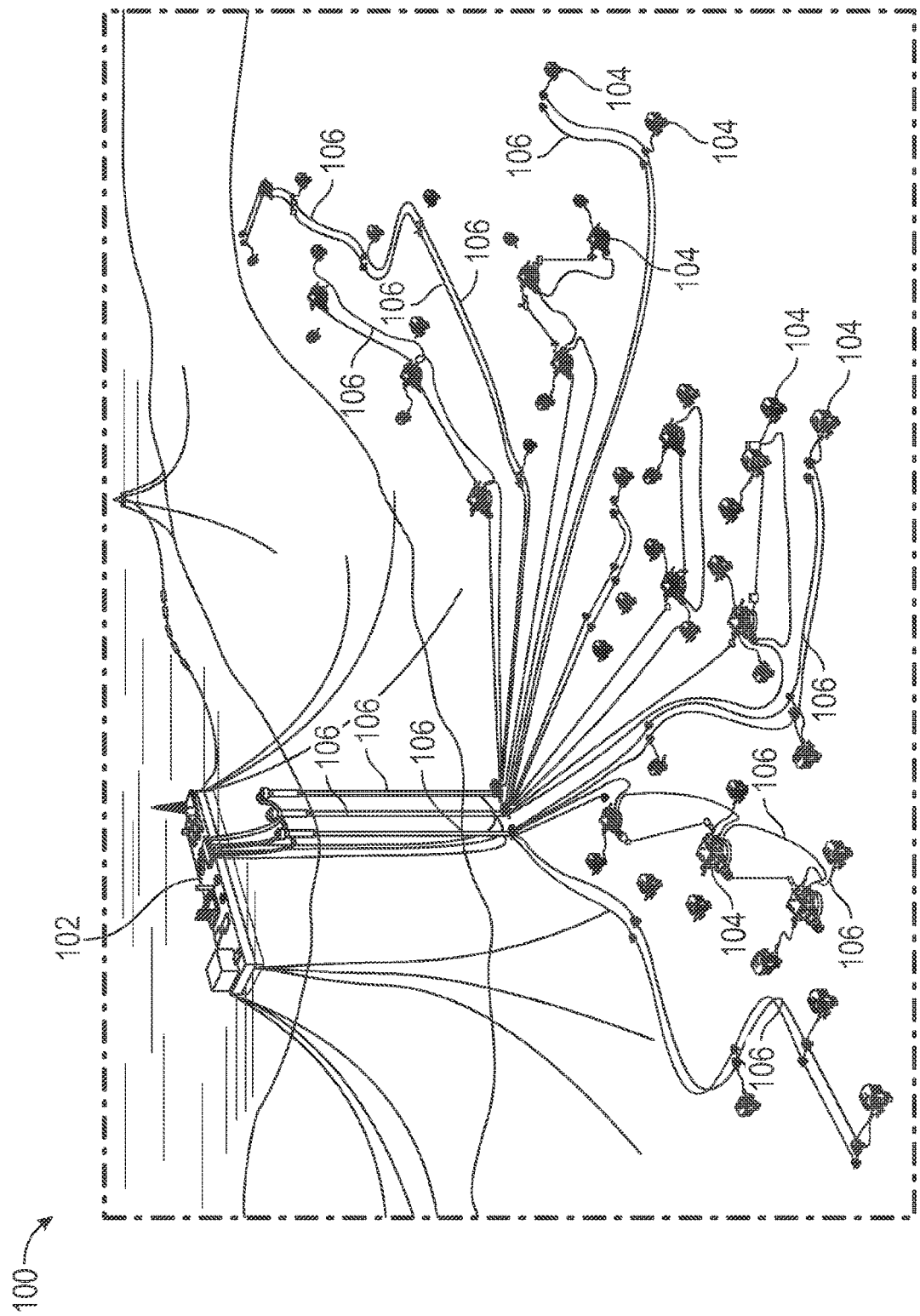
FIG. 1 is a schematic view of one example of an offshore oil or natural gas rig including an umbilical having a plurality of tube assemblies.

Industries desire a high strength tube or pipe, tube product (e.g., tube assembly as provided herein) or the like. In some examples cold working (or work hardening) the product during production is used to increase the strength (e.g., yield strength of the product) of welded connections (e.g., weld assemblies). The techniques and examples provided herein provide strengthened weld assemblies having thoroughly work hardened weld fusion zones, weld interfaces (e.g., former heat affected zones created during welding). The weld assemblies in some examples have mechanical characteristics, such as yield strength or the like, proximate to a specified characteristic (such as yield strength) of the base material of the component tubes. In another example, the techniques and examples included herein provide controlled and predictable yield strengths while maintaining specified ductility (elongation) and uniformity (of strength). Further, the techniques and examples provided herein also provide controlled and predictable hardness, ultimate strength (tensile strength) and related characteristics such as fatigue life (e.g., endurance limit).

The products and methods described herein include welded connections and associated localized zones of the base material that are consistently and predictably work hardened (e.g., cold worked, cold rolled or the like). Products (e.g., tubes, pipes or the like) including these improved strength welded connections have enhanced strength, including yield strengths (of at least 90,000 psi in some examples) that facilitate the use of the products in extreme environments and conditions (e.g., offshore petroleum and natural gas production and mining, mining, drilling including down hole drilling, fluid transport and storage, work strings, velocity strings, capillary tubing, encapsulated wire tubing, casings, oil and gas production tubing, manufacturing, submersible vehicles, vehicles, space and atmospheric vehicles or the like). The methods of welding and work hardening welds described herein provide welded connections and local base materials interfacing with the welds having high strength. With the proprietary processes, significant and consistent strength recovery is achieved in products otherwise having limited strength welded connections.

The methods described herein are used, in some examples, with a variety of base materials including, but not limited to, materials that are cold worked (or work hardened) during production to achieve (e.g., increase) specified mechanical characteristics, such as yield strength, ultimate (tensile) strength, hardness and fatigue life. Example materials include, but are not limited to, carbon steel, alloy steel, stainless steel, nickel based alloys, copper and copper alloys, beryllium and beryllium alloys, and titanium and titanium alloys. Example stainless steels include duplex steels (e.g., S32205) and super duplex steels (e.g. S32750 or SAF2507®, a registered trademark of Sandvik Intellectual Property AB Corporation; S32760; or Zeron® 100, a registered trademark of Weir Engineering Services Limited Co.). Example nickel based alloys include N06625; N08825; Hastelloy®, a registered trademark of Haynes International, Inc.; Incoloy®, and Inconel® alloys, registered trademarks of Huntington Alloys Corporation.

FIG. 1 shows one example of a production system 100 for use in a subsea environment. As shown, the production system 100 includes a plurality of subsea production devices 104 coupled by way of umbilicals 106 to an installation vessel 102. In one example, the production system 100 includes the subsea production devices 104 in a distributed pattern, for instance, across a sea floor. As shown in FIG. 1, a variety of subsea production devices 104 are spread away from vertically terminating umbilicals 106 and are accordingly spread from the vertically terminating umbilicals 106 by one or more horizontal umbilicals 106 resting along the sea floor.

In some examples, subsea production devices 104 include, but are not limited to, umbilical termination assemblies, subsea distribution units, subsea control modules, production trees, electric flying leads, hydraulic flying leads or the like. As shown, the devices 104 are distributed away from the installation vessel 102. Each of the devices require one or more utilities including, but not limited to, fluids such as water, methanol, well fluids, compressed gases, electricity, hydraulic fluid as well as one or more of cabling, wiring or the like for monitoring and operation of the devices. In other examples, the production devices 104 are configured to capture production fluids such as natural gas, oil or the like and deliver these fluids through the umbilicals 106 along flow lines to the installation vessel 102, for instance, for storage, transportation to other devices, vessels, rigs or the like.

Referring again to FIG. 1, a plurality of umbilicals 106 are shown extending from the installation vessel 102 to the sea floor and across the sea floor to the one or more subsea production devices 104. Umbilicals 106 strung from the installation vessel 102 to the sea floor and across the sea floor have enhanced mechanical characteristics, for instance, one or more of ultimate (tensile) strength, hardness, fatigue life, yield strength or the like. For instance, in one example, umbilicals 106 extending from the installation vessels 102 and across the subsea floor are subjected to significant tensile stresses, compressive stresses or the like caused by the weight of the umbilicals 106 during deployment as well as suspension from the vessel 102, seawater pressure or the like. In one example, the umbilicals 106 are specified to have a yield strength of 90,000 psi or more. Additionally, in other examples, the umbilicals 106 are used in corrosive and high pressure environments requiring one or more additives, elements or the like to the material of the umbilicals 106 to facilitate the long term use of the umbilicals 106 in these environments. In one example, the umbilicals 106 include nickel, nickel alloys or the like configured to provide high strength and corrosion resistance within one or more environments including a subsea environment, a high temperature environment or combinations of the same.

Additionally, nickel alloys, when included with the umbilicals 106, are processed with one or more methods, for instance, by work hardening to increase the strength of the materials while at the same time maintaining the corrosion resistance provided by one or more of the alloying additives, such as, nickel. Work hardening includes one or more of cold working, cold rolling or the like that plastically deforms the base material of the umbilical 106, for instance, one or more of the sheaths, component tubes or the like comprising the umbilical. In one example, the cold working, cold rolling (e.g., work hardening) of the base material of the umbilical including one or more of the component tubes of the umbilical provides a high strength component or a portion of a high strength component configured to have a yield strength of at least 90,000 psi or more. Work hardening of the base material of the component tubes provides enhanced mechanical characteristics to the component tubes while minimizing increases in wall thickness or the like that increase mechanical characteristics but adversely increase the weight of the umbilicals 106 (and accordingly introduce addition weight based stress).

Figure 2:
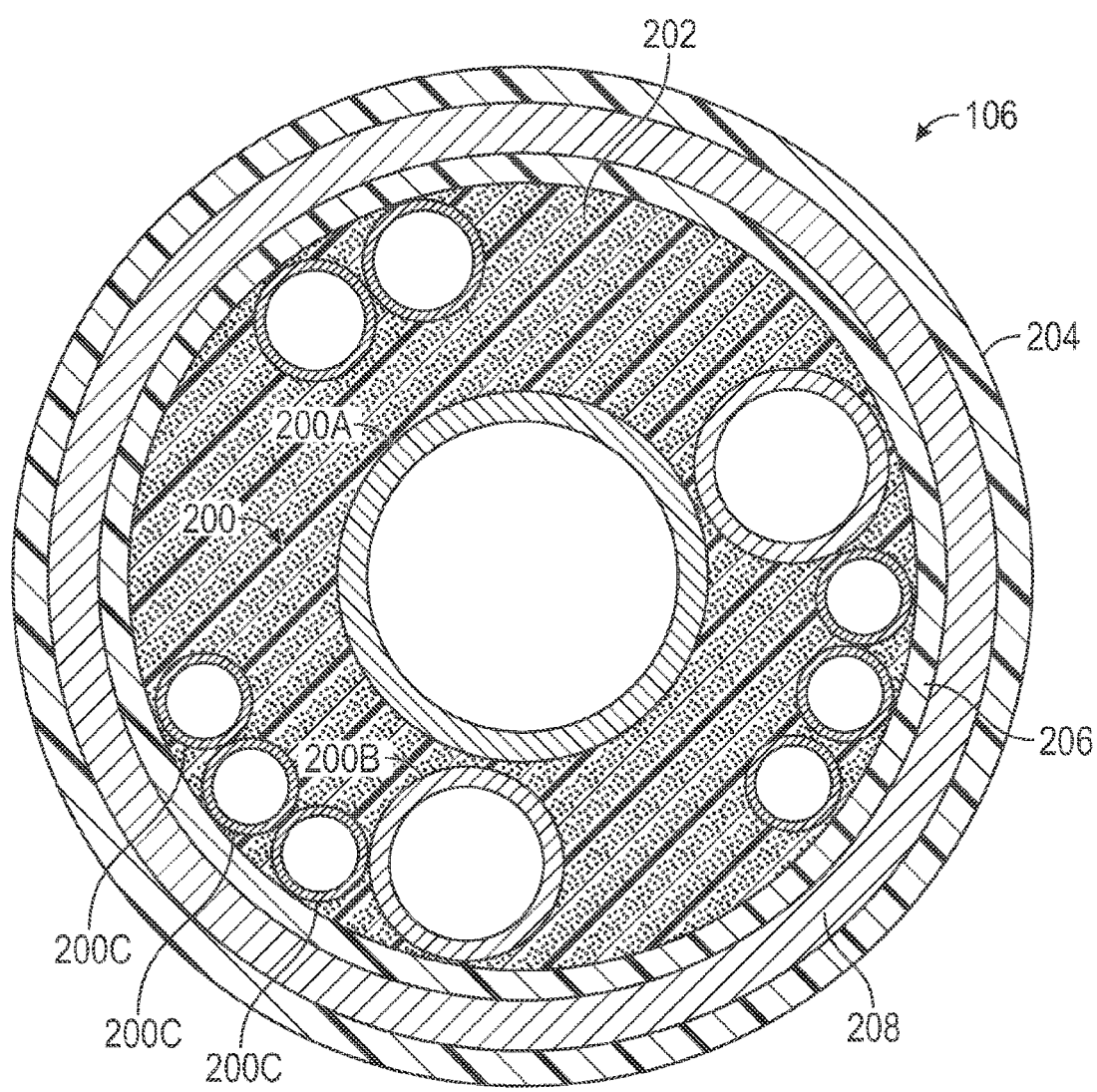
FIG. 2 is a cross sectional view of the umbilical of FIG. 1.

FIG. 2 shows one example of an umbilical 106 in a cross-sectional view. As shown, the umbilical 106 includes a plurality of tubes such as a tube assembly 200. Each of the component tubes of the tube assembly 200 is configured to provide one or more utilities, for instance, to one or more of the subsea production devices 104 or facilitate the return of fluids, for instance, production fluids from the sea floor, for instance, along a flow line such as the central tube 200A shown in FIG. 2. In another example, the tube assembly 200 includes one or more injection lines, such as the component tubes 200B, configured to provide one or more fluid based utilities such as water, chemicals, hydraulic fluid or the like to one or more of the production devices 104 provided on the sea floor. In another example, the component tubes 200B are configured to provide one or more chemicals, fluids such as water, or the like below the sea floor surface, for instance, to initiate production of one or more production fluids, such as natural gas, oil or the like. In another example, the tube assembly 200 of the umbilical 106 includes one or more hydraulic control lines 200C (also component tubes) configured to provide varying flows of hydraulic fluid to and from one or more of the production devices 104 provided along the sea floor.

As shown in FIG. 2, the example umbilical 106 includes a plurality of one or more of the various tubes configured to provide a plurality of separate flows of the various utilities to one or more production devices. Accordingly, in some examples, umbilicals 106 include a plurality of tubes in the tube assembly 200 and these component tubes may have diameters from around ⅜ inch to 12 inches or more. In still other examples, the example umbilicals 106 include one or more conduits, such as tubing or the like, configured to deliver one or more other utilities including, but not limited to, electrical power, monitoring and control, wiring, cabling (including structural support cabling) or the like between the installation vessel 102 (shown in FIG. 1) and one or more production devices 104 provided along the sea floor. Optionally, additional component conduits (e.g., tubes) are included with the umbilical to provide structural support to the umbilical 106, such as enhanced tensile strength, during one or more of deployment to the sea floor or suspension from the installation vessel 102. Accordingly, the example umbilicals 106 are, in some examples, robust with a plurality of tubes included with the tube assembly 200. Additionally, in example umbilicals 106 including one or more flow lines, such as the flow line 200A, the umbilicals are further enlarged to accommodate the flow of production fluids including, but not limited to, natural gas, crude oil or the like to the vessel 102, a rig or other storage or processing location, at the surface.

As further shown in FIG. 2, the umbilical 106 is, in one example, constructed with one or more sheaths. In the example shown in FIG. 2, the umbilical 106 includes an inner sheath 206 and an outer sheath 204. An armor jacket 208 is optionally provided between the inner and outer sheaths 206, 204. The inner and outer sheaths 206, 204 as well as the armor jacket 208 surround and protect the tube assembly 200 including the component tubes 200A, B, C previously described and shown herein. The armor jacket 208, in one example, includes steel, Kevlar (a registered trademark of E.I. Du Pont De Nemours and Company Corporation), or other structurally robust materials configured to protect the components within the umbilical 106, including sensitive components such as fiber optic cables, electrical cabling, wiring and to protect one or more of the fluid based utility line tubes 200B or the flow line tubes 200A from damage, for instance, from collisions with other umbilicals, friction or the like.

Additionally and in some examples, the umbilical 106 includes an umbilical cavity 202 including, but not limited to, one or more interstitial spaces between various components of the umbilical, for instance, various component tubes of the tube assembly 200 (e.g., fluid flow lines, wiring and cable conduits, structural support tubes or the like) and various components (e.g., tubes, layers or the like) surrounding a tube such as a flow line 200A or the like. Tape, foam, adhesives or the like are provided, in one example, to lock the component tubes of the tube assembly 200 together. In still other examples, the component tubes of the tube assembly 200 including, but not limited to, tubes 200A, 200B, 200C are wound helically to interlock the tubes with each other. The component tubes 200A, 200B, 200C are then positioned within one or more of the sheaths 206, 204, armor jacket 208 or the like to form the umbilical 106.

The materials used in the umbilical, including the tube assembly 200, include, but are not limited to, stainless steel, such as stainless steel 316L, duplex, super duplex, hyper duplex stainless steels, zinc coated nitronic 19D, nickel alloys or the like. The inclusion of one or more tubes, for instance, as shown in the tube assembly 200 as well as one or more of wiring, cabling, structural components such as steel cables, support tubes, carbon fiber rods, one or more sheaths 204, 206 and an armor jacket 208 (e.g., such as a Kevlar armor jacket) to the umbilical 106, in one example, increases the weight of the umbilical 106, for instance on a per unit length basis. Umbilicals 106 are suspended from an installation vessel 102 as shown in FIG. 1 at least during installation, and in some examples during production (as is the case with the vertically suspended umbilicals 106 shown in FIG. 1). Umbilicals 106, in some examples, extend thousands of feet to the sea floor, for instance, to the one or more subsea production devices 104 shown in FIG. 1 and optionally extend across the sea floor to additional devices 104. Accordingly, the umbilicals 106 have enhanced mechanical characteristics to withstand the tensile forces incident on the umbilicals 106 when suspended from the installation vessel 102 as well as one or more of high pressure (compressive forces), high temperatures, corrosive environments or the like, for instance, along the sea floor.

To withstand these forces, pressure and environmental conditions the umbilical 106, for instance used and shown in FIG. 1, includes one or more enhanced material characteristics including, for instance, a yield strength approaching 90,000 psi or more. As previously described herein, and in at least some examples, these materials (e.g., stainless steel, duplex, super duplex, hyper duplex stainless steels, nickel alloys and the like) are work hardened to enhance the strength of these materials and accordingly facilitate the suspension of the heavy umbilicals 106 from the installation vessel 102 thousands of feet, for instance, 4,000 feet, 5,000 feet, 6,000 feet, 7,000 feet, 8,000 feet or more. Accordingly, the umbilicals 106 described herein include sufficient structural integrity to remain suspended from the installation vessels 102 without fracturing, splitting, deforming or the like under their own weight when suspended.

Figure 3:
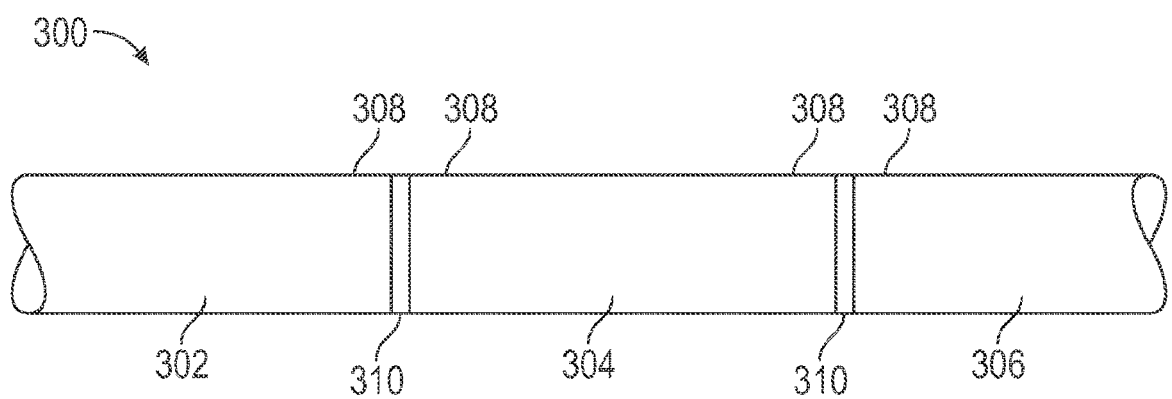
FIG. 3 is a side view of one example of a tube assembly including a plurality of welded connections.

FIG. 3 shows one example of a component assembly 300, for instance, a tube assembly including a plurality of components such as a first component 302, a second component 304 and one or more supplemental components 306 (e.g., tubes). As shown, each of the components 302, 304, 306 are coupled in an end-to-end fashion, for instance, with one or more weld assemblies 310 provided therebetween. As further shown in FIG. 3, each of the components includes respective component ends 308 provided proximate to each of the weld assemblies 310.

As further shown in FIG. 3, the weld assemblies 310 provided between the first, second and supplemental components 302, 304, 306 interconnect each of the components and accordingly join the components to form the component assembly 300. An umbilical, such as the umbilical 106 shown in FIGS. 1 and 2, includes a plurality of components such as tubes 302, 304, 306 that are coupled in an end-to-end fashion, for instance, for each of the component tubes of the tube assembly 200. Stated another way, the plurality of tubes used in the tube assembly 200 as well as other components of the umbilical 106 are, in one example, end-to-end components such as the first, second and supplemental components 302, 304, 306 each joined together with weld assemblies 310 provided therebetween. With reference to FIG. 1, the umbilicals 106 extending from the installation vessel 102 to the sea floor and across the sea floor to each of the one or more subsea production devices 104 includes, in some examples, thousands of individual components such as interconnected first, second and supplemental components 302, 304, 306 in parallel and in series with each other. For instance, the components in parallel include one or more component tubes as shown in the cross-section of the umbilical 106, for instance in FIG. 2. Each of the component tubes 200A, 200B, 200C of the tube assembly 200 in turn include multiple components, for instance, hundreds or thousands of component tubes welded from end to end, for instance, with interposing weld assemblies 310 shown in FIG. 3.

Figure 4A:
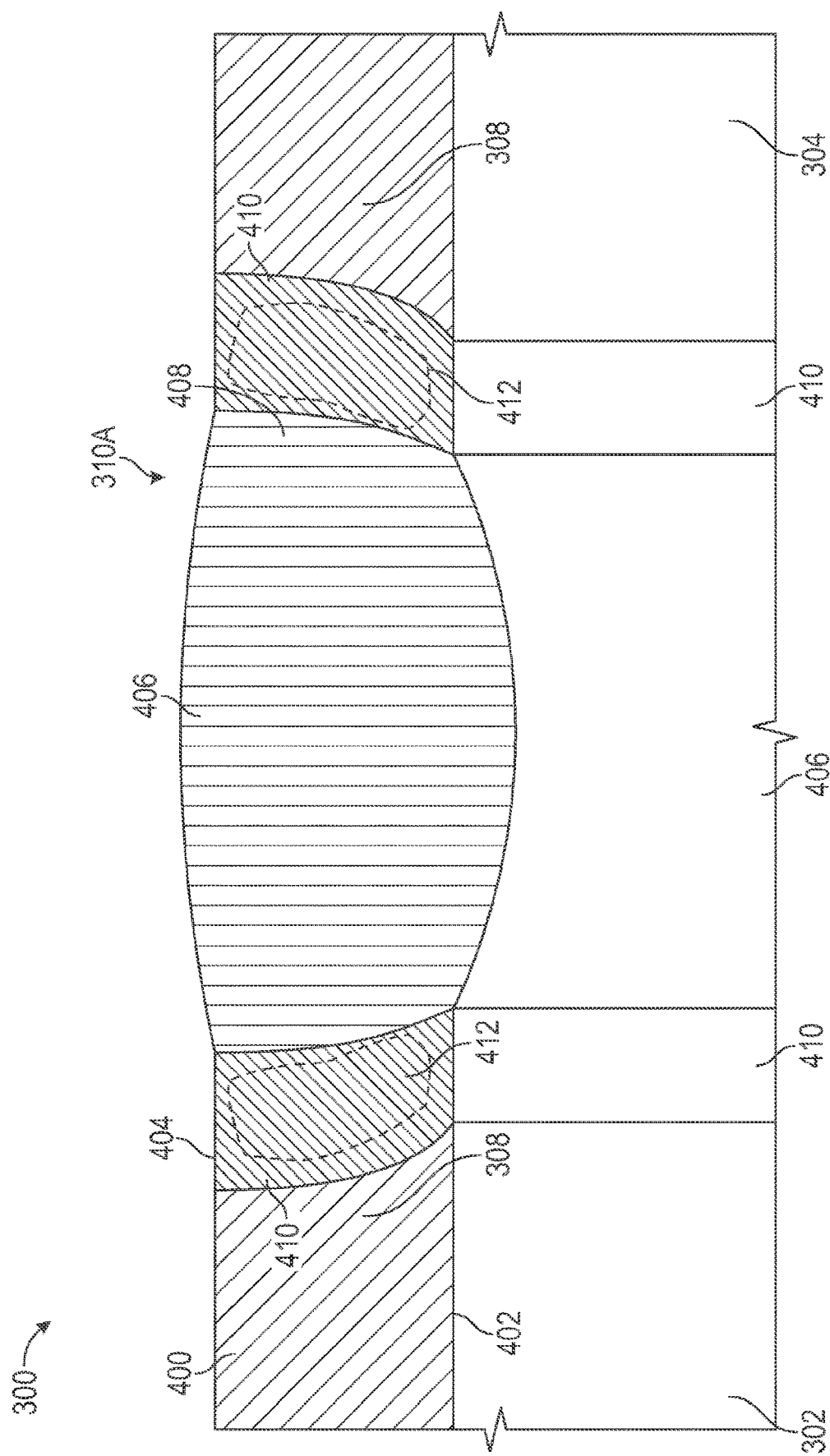
FIG. 4A is a detailed cross sectional view of one example of a weld assembly for the tube assembly of FIG. 3.

FIG. 4A shows a detailed cross-sectional view of an example weld assembly 310A optionally used as the weld assembly 310 in FIG. 3. In the example shown in FIG. 4A, the weld assembly 310A includes a weld fusion zone 406 joining the first and second components 302, 304 at their respective component ends 308. As previously described, the components such as the first and second components 302, 304 are, in one example, constructed with the base material having enhanced mechanical characteristics including, but not limited to, ultimate or tensile strength, yield strength, hardness, fatigue life or the like.

Referring again to FIG. 4A, the weld assembly 310A is shown with a weld fusion zone 406 positioned within a weld recess 408 between the component ends 308 of each of the first and second components 302, 304. The weld fusion zone 406 is applied to the first and second components 302, 304 between the tube exteriors 404 and the tube interiors 402 of each of the first and second component 302, 304, for instance with a thickness proximate to the side wall 400 thickness of the components. As shown, the weld fusion zone 406 includes one or more of a weld filler, resolidified base material or the like. The weld fusion zone 406 is also referred to in some examples as weld-cast, as-cast, re-cast or the like. The weld fusion zone 406 couples the first and second components 302, 304 together. Further, as shown in FIG. 4A, a weld interface 410 is provided between the weld fusion zone 406 and the remainder of the base material of each of the components 302, 304. The high temperature of the weld fusion zone 406 (e.g., molten metal including one or more of a weld filler and melted base material) along the weld interfaces 410 anneals the (unmelted but adjacent) base material of the components 302, 304 proximate to the weld fusion zone 406. For instance, as shown in FIG. 4A, the weld interface 410 is, in one example, a heat affected zone. A heat affected zone (HAZ) has one or more decreased mechanical characteristics relative to the remainder of the base material of each of the components 302, 304. For instance, the yield strength, ultimate tensile strength or the like at the weld interfaces 410 have strengths 30,000 psi or less relative to the base (work hardened and unannealed) material of the remainder of the components. Accordingly, the weld interfaces 410 provide a localized region of the component assembly 300 relatively weaker compared to the remainder of the base material used in the component assembly 300. Accordingly, when one or more of tension, compression or the like is applied along the component assembly 300, for instance while suspended from the installation vessel 102 shown in FIG. 1, while positioned along the sea floor or the like, the component assembly 300 including the weld assembly 310A provides one or more weakened locations subject to failure.

Referring again to FIG. 4A, the weld assembly 310A is, in one example, work hardened, for instance, by one or more of cold working, cold rolling, hammering or the like to plastically deform the weld fusion zone 406 and a portion of the weld interface 410. Plastic deformation of the weld fusion zone 406 and the portion of the weld interface 410 enhances the strength in one or more of those components. For instance, a rolling mechanism, hammering mechanism or the like is applied along one or more of the faces of the components 302, 304, for instance, proximate to the weld assembly 310A to plastically deform the weld fusion zone 406 local to the applied force. The plastic deformation of the weld fusion zone 406, in one example, work hardens the weld fusion zone 406 and locally (relative to the applied force and plastic deformation) increases one or more of its mechanical characteristics such as ultimate strength, yield strength, fatigue life or the like relative to the base weld fusion zone 406.

Further, work hardening of the weld interface 410 (in contrast to the weld fusion zone 406), for instance, along one of the tube exterior 404, if work hardened from the exterior, or the tube interior 402, if work hardened from the interior, may incidentally enhance the mechanical characteristics of a portion of the weld interfaces 410. Because the weld interfaces 410 are substantially flush with the remainder of the base material of the components, such as the first and second components 302, 304, deformation of the weld interfaces 410 is proximate to either of the tube interior 402 or the tube exterior 404 (and may be absent) depending on where work hardening is performed and whether the weld interfaces are in fact plastically deformed at the weld assembly 310A. Accordingly, work hardening of the weld interfaces 410 is localized at the exterior 404 or interior 402 while the remainder of the weld interfaces 410 for instance, along at least a portion of weld interface segments 412 (shown in broken lines in FIG. 4A) retains the heat affected or annealed configuration of the base material.

In this example, the weld interfaces 410 on either side of the weld fusion zone 406 (e.g., and corresponding the weld interface segments 412 in an example) are within the heat affected zone, remain annealed (and are not enhanced), and thereby have one or more decreased mechanical characteristics that remain depressed even after work hardening procedures. For instance, the weld interfaces 410 on each side of the weld assembly 310A have one or more of ultimate strength, yield strength or the like 30,000 psi or less relative to the base material of the first and second components 302, 304. Accordingly, while the weld fusion zone 406 is, in this example, at least partially plastically deformed and includes mechanical characteristics that may approach the mechanical characteristics of the first and second components 302, 304 each of the weld interfaces 410, for instance the weld interface segments 412, extending from proximate the tube interior 402 to proximate the tube exterior 404 have mechanical characteristics less than the mechanical characteristics of these other components. Accordingly, the weld assembly 310A is prone to one or more of fracture, failure, fatigue based deformation or the like while the remainder of the component assembly 300 including, for instance, the base material of the first and second components 302, 304 (in a work hardened and unannealed configuration) maintains its relatively strong mechanical characteristics compared to the weld assembly 310A.

When the component assembly 300 including the weld assembly 310A is used in another assembly, such as the umbilical 106 shown in FIG. 2, and then deployed or suspended (e.g., from an installation vessel 102) significant tensile stresses are applied to the umbilical 106. These tensile stresses, for instance 90,000 psi or more, in some examples may cause failure of the umbilical 106 at one or more of the weld assemblies 310A. Additionally, when used along a subsea surface (e.g., at extreme depths) the component assembly 300 including the weld assemblies 310A is subject to significant hydrostatic pressures (and corresponding stresses) and in other examples may fail at the weld assemblies 310A. In some examples, the side wall 400 is thickened to provide enhanced mechanical characteristics to offset weakness at the weld assemblies 310A. Thickening of the side wall 400 increases the mass of the component assembly 300 and accordingly generates additional tensile stresses that in an example further aggravate failure at the weld assemblies 310A.

Figure 4B:
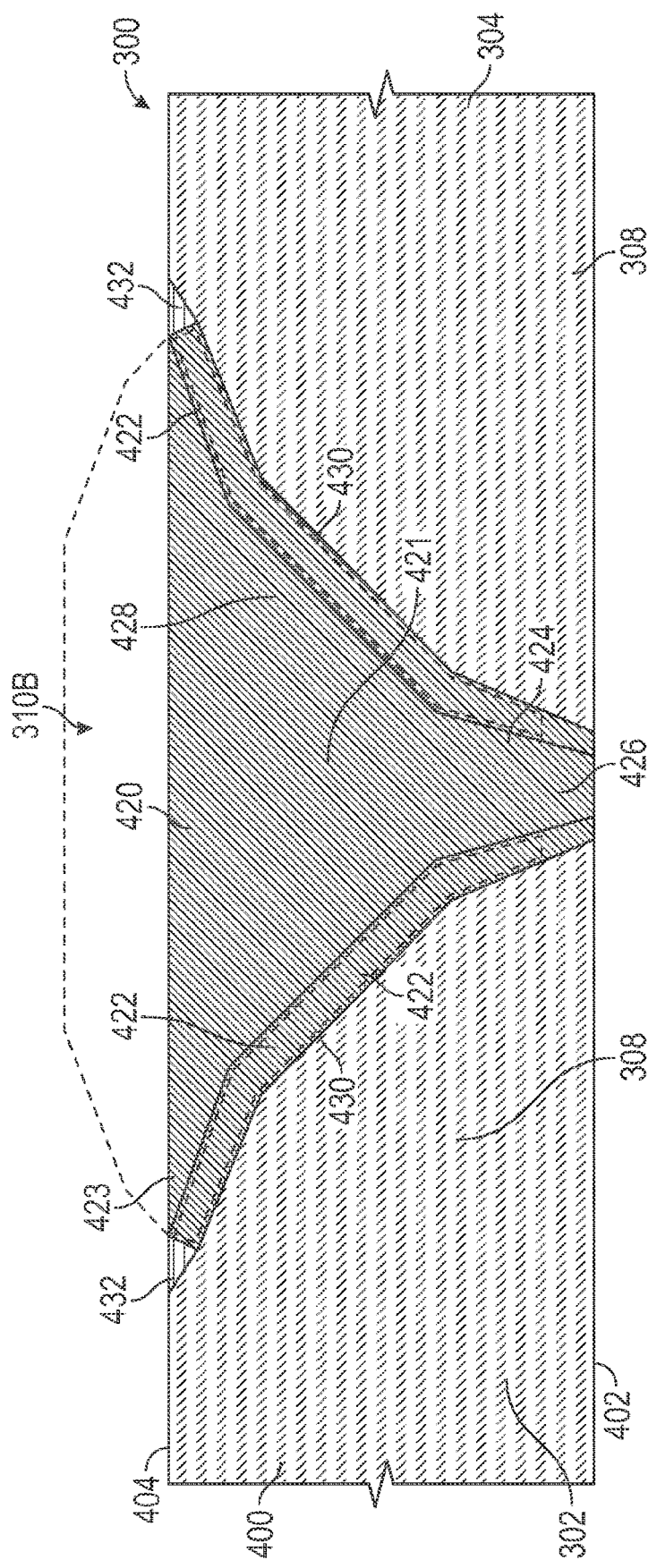
FIG. 4B is a detailed cross sectional view of another example of a weld assembly for the tube assembly of FIG. 3 having a work hardened configuration.

FIG. 4B shows a cross-sectional view of another weld assembly 310B, for instance, used as the weld assembly 310 in FIG. 3. In this example, the weld assembly 310B includes one or more portions of the components such as the first and second components 302, 304 (e.g., first and second tubes). The first and second components 302, 304 include component ends, such as tube ends, constructed with the base material of the remainder of the first and second components 302, 304 including, but not limited to, one or more of stainless steel, such as stainless steel 316L, duplex, super duplex, hyper duplex stainless steels, zinc coated nitronic 19D, nickel alloys or the like. As previously described, the first and second components 302, 304 are, in one example, constructed with and then treated with one or more processes configured for use with stainless steel to provide enhanced mechanical characteristics. For instance, in one example, the first and second components are constructed with a base material such as nickel alloys, stainless steel, duplex stainless steel, super duplex stainless steel, hyper duplex stainless steel or the like. The base material is then work hardened by one or more of cold rolling or the like to impart enhanced mechanical characteristics including one or more of increased ultimate tensile strength, yield strength, fatigue life, hardness or the like relative to the unworked base material of each of the first and second components 302, 304.

As further shown in FIG. 4B, the weld assembly 310B includes a weld fusion zone 420 positioned within a weld recess 424. In this example, the weld recess 424 extends from a recess root 426, for instance, proximate to the tube interior surface 402 and extends from the tube interior 402 surface across the sidewall 400 of each of the first and second components, 302, 304 to proximate the tube exterior surface 404. At the tube exterior the weld recess 424 opens or outwardly tapers to a recess opening 428 as shown in FIG. 4B. In contrast to the weld assembly 310A shown in FIG. 4A, the weld assembly 310B shown in FIG. 4B tapers or laterally extends from the recess root 426 to the recess opening 428. Accordingly, the corresponding weld interfaces 422 of each of the first and second components 302, 304 are laterally extending, for instance from the recess root 426 proximate the tube interior surface 402 to proximate the tube exterior surface 404, for instance, corresponding to the recess opening 428. Accordingly, additional weld fusion zone 420 (optionally multiple passes of weld filler and molten base material) is provided within the weld recess 424 to fill the weld recess.

Additionally, as shown in broken lines in FIG. 4B, prior to work hardening the weld fusion zone 420 is in this example layered above the tube exterior surface 404 of each of the first and second components 302, 304. For instance, the weld fusion zone 420 includes a weld skirt 423 extending to the left and right relative to the recess root 426.

As described herein, work hardening (e.g., cold rolling, cold working or the like) is applied to the weld assembly 310B including the weld fusion zone 420 to work harden the weld fusion zone 420 as well as the weld interfaces 422 sandwiched between the weld fusion zone 420 and the base material underlying the laterally extending weld interfaces 422. In this example, the underlying base material includes the portions of the sidewall 400 constructed with the base material that retain work hardened characteristics (e.g., are spaced from the weld fusion zone 420).

Referring again to FIG. 4B, the weld fusion zone 420 as shown is provided within the weld recess 424, for instance, from the recess root 426 with a portion of the weld fusion zone including a base weld portion 421. In one example, the weld fusion zone 420 includes multiple passes to fill the weld recess 424 and provide a weld skirt 423 (e.g. of a weld filler mixed with resolidified base material or the like) extending over the lateral portions of the weld interfaces 422 of each of the first and second components 302, 304. Accordingly, as shown in FIG. 4B, the weld fusion zone 420, when positioned within the weld recess 424 and applied as a weld skirt 423 extends over top of a portion of the first and second components 302, 304 and overlies the weld interfaces 422.

The weld fusion zone 420 is shown in FIG. 4B in an upwardly tapering configuration, for instance, with the smallest portion of the taper proximate to the recess root 426 and proximate to the tube interior surface 402. In another example, the weld assembly 310B has a converse arrangement, for instance, with the recess root 426 positioned proximate to the tube exterior surface 404 and the recess opening 428 and the corresponding portion of the weld fusion zone 420 such as the weld skirt 423 positioned proximate to the tube interior surface 402.

The weld fusion zone 420 at application (e.g., application of a heated weld filler) includes one or more of weld filler, molten base material or the like. The weld fusion zone 420 heats (but does not melt) adjacent first and second components 302, 304 along the weld interfaces 422. Instead, the heated weld interfaces 422 are annealed and accordingly include heat affected zones (HAZ) therein. Annealing is most pronounced adjacent to the weld fusion zone 420 and gradually decreases across the weld interfaces 422 away from the zone 420 having the high temperature. The weld interfaces 422 (including HAZ prior to work hardening as described herein) accordingly have decreased mechanical characteristics including, but not limited to, yield strength, ultimate strength, hardness, fatigue life or the like relative to the base material of the remainder of the first and second components 302, 304 (e.g., outside of the weld interfaces 422). Accordingly, in this intermediate configuration (prior to the work hardened configuration shown in FIG. 4B), the weld assembly 310B provides a localized weakness to the component assembly 300.

With work hardening of the weld assembly 310B having the configuration shown in FIG. 4B the weld assembly 310B includes enhanced, consistent and predictable mechanical characteristics. Further, the enhanced mechanical characteristics are consistently and predictably provided along the weld fusion zone 420, and the weld interface segments 430 (shown in broken lines) extending from proximate the tube exterior surface 404 to proximate the tube interior surface 402. Stated another way, the mechanical characteristics of the weld assembly 310B are greater than the mechanical characteristics of the weld assembly 310A shown in FIG. 4A. For instance, in one example, the weld assembly 310B constructed and work hardened in a manner described herein includes one or more of ultimate strength (including tensile strength), yield strength, hardness, fatigue life or the like approaching that of the base material of each of the first and second components 302, 304. For instance, each of the base material in the first and second components 302, 304 as well as the weld assembly 310B have yield strengths, in one example, of 90,000 psi or greater. In another example, the strength of the weld assembly 310B has one or more strengths including, for instance, yield strength, ultimate strength or the like within 8,000 psi, 6,000 psi, 4,000 psi, 2,000 psi or the like of the (unannealed) base material of the first and second components 302, 304.

To achieve the mechanical characteristics specified with the weld assembly 310B, the weld fusion zone 420 shown in FIG. 4B by the broken lines extends above one or more of the surfaces such as the tube exterior surface 404 or the tube interior surface 402 (in a converse configuration) of the components 302, 304. Additionally, a portion of the weld fusion zone 420, the weld skirt 423, extends laterally along a weld bed of the weld interfaces 422, for instance, from a bed root of the weld interfaces 422 proximate the recess root 426 to the bed opening proximate the recess opening 428.

Mechanical deformation of the weld fusion zone 420 projecting from the tube exterior surface 404, in this example, plastically deforms and drives the weld fusion zone 420 vertically into the first and second components 302, 304. As shown in FIG. 4B, mechanical deformation (e.g., including work hardening, cold rolling, cold working or the like) drives the weld fusion zone 420 toward the weld interfaces 422 and the underlying component ends 308 of each of the first and second components 302, 304. Because the weld interfaces 422 are shaped as described herein the weld interfaces 422 extend laterally relative to the weld interfaces previously shown (in FIG. 4A) the weld fusion zone 420 and the component ends 308 of each of the first and second components 302, 304 sandwich the weld interfaces therebetween. Additionally, HAZ follows the contour of the weld interfaces 422 and accordingly also extends laterally, and is not otherwise concealed or isolated in a column of HAZ (as in FIG. 4A). Accordingly, work hardening of the weld fusion zone 420 plastically deforms the weld fusion zone 420 and correspondingly drives the zone 420 into the annealed weld interfaces 422. By driving the weld fusion zone 420 into the weld interfaces 422 extending laterally along the weld fusion zone 420, the weld interfaces 422 are plastically deformed and thereby work hardened in a similar manner to the weld fusion zone 420. The lateral extension (e.g., shape, profile or the like) of the weld interfaces 422 ensures HAZ in the weld interfaces 422 is exposed to plastic deformation from the weld fusion zone 420 and not otherwise isolated from deformation (e.g., as in the weld assembly 310A in FIG. 4A).

In the example shown in FIG. 4B, work hardening is present in at least the weld interface segments 430 (the broken line region) of the weld interfaces 422 extending from proximate to the tube exterior surface 404 to proximate to the tube interior surface 402. Work hardening is applied continuously through the weld assembly 310B, for instance, from proximate to the tube exterior surface 404 to proximate to the tube interior surface 402. The previously described annealed portions of the weld assembly 310A, for instance, corresponding to the weld interface segments 412 shown in FIG. 4A are minimized (e.g., eliminated, decreased or the like). Instead, the weld assembly 310B includes work hardened weld interfaces 422 including weld interface segments 430 that are predictably and consistently plastically deformed to accordingly work harden the segments 430 and enhance mechanical characteristics of each of the weld fusion zone 420 and the weld interface segments 430 in comparison to the base materials of the first and second components 302, 304. Accordingly, the mechanical characteristics specified for the first and second components 302, 304 including one or more of ultimate strength such as tensile strength, yield strength, hardness, fatigue life and the like are carried through the weld assembly 310B.

Accordingly, the component assembly 300, including the weld assembly 310B, provides an assembly having consistent mechanical characteristics while minimizing localized weaknesses in the component assembly 300 that are otherwise subject to failure, for instance, an umbilical such as the umbilicals 106 shown in FIG. 1 suspended from an installation vessel 102 to a sea floor and subject to tensile stresses. In contrast to the weld assembly 310A shown, for instance, in FIG. 4A, having relatively large heat affected zones (HAZ) extending, for instance, from proximate the tube interior 402 to proximate the tube exterior 404, the weld assembly 310B, shown in FIG. 4B, has consistently enhanced mechanical characteristics (relative to those of assembly 310A) between the tube exterior surface 404 and the tube interior surface 402 provided through plastic deformation transmitted through the weld fusion zone 420 to the weld interfaces 422 extending laterally as shown in FIG. 4B. In some examples, there is some variation in the mechanical characteristics between the exterior and interior surfaces 404, 402 because cold working is initiated, in this example, proximate to the tube exterior surface 404. For instance, the yield strength of the weld assembly 310B proximate to the tube exterior surface 404 matches or even exceeds the yield strength of the base material, while the yield strength of the assembly 310B proximate the tube interior surface 402 (also enhanced by cold working) is optionally below that of the base material (e.g., 10,000 psi or less). These variations are incidental compared to variations in the weld assembly 310A including example variations of 10,000 psi, 20,000 psi or 30,000 psi or more because the assembly 310A includes extensive heat affected zones (HAZ).

Further, in contrast to the extensive heat affected zones remaining in the weld assembly 310A shown in FIG. 4A, the weld assembly 310B includes, in some examples, incidental localized heat affected zones, for instance, proximate to the tube exterior surface 404 shown in FIG. 4B by the heat affected beads 432. In another example, one or more heat affected zones remain in close proximity to the base of the weld assembly 310B, for instance, proximate to the recess root 426. In either of these examples, the heat affected bead 432 provided proximate to the tube exterior surface 404, remaining portions of the weld interface 422 local to the recess root 426 or the like (including other incidental locations) are incidental components of the overall work hardened weld assembly 310B, and are in some examples work hardened to various degrees through work hardening of the remainder of the assembly 310B. In still other examples, and as described herein the degree of work hardening proximate the tube exterior surface 404 is greater than the work hardening proximate the tube interior surface 402 because work hardening is initiated along the tube exterior surface 404. Even with these variations, and as shown in FIG. 4B, the work hardened weld interface segments 430 extending from proximate the tube interior surface 402 to proximate the tube exterior surface 404 provide overall consistently enhanced mechanical characteristics that ensure the weld assembly 310B has correspondingly enhanced mechanical characteristics approaching those of the base material when compared with the weld assembly 310A shown, for instance, in FIG. 4A.

FIGS. 5A-D show examples of component assemblies 501, 503, 505, 507 including a variety of end profiles for one or more of the component assemblies described herein. In describing each of these end profiles, the corresponding component assemblies 501, 503, 505 assist in shaping weld joints and the corresponding weld fusion zones (in the joints) to extend laterally. In at least some examples, the laterally shaped joints and weld fusion zones enhance the work hardening of weld interfaces as well as the weld fusion zone to provide weld assemblies having mechanical characteristics approaching those of the base material of the components 302, 304 such as tubes or the like. These end profiles are formed with one or more methods including, but not limited to, machining, casting, rolling, die forming, forging or the like.

Figure 5A:
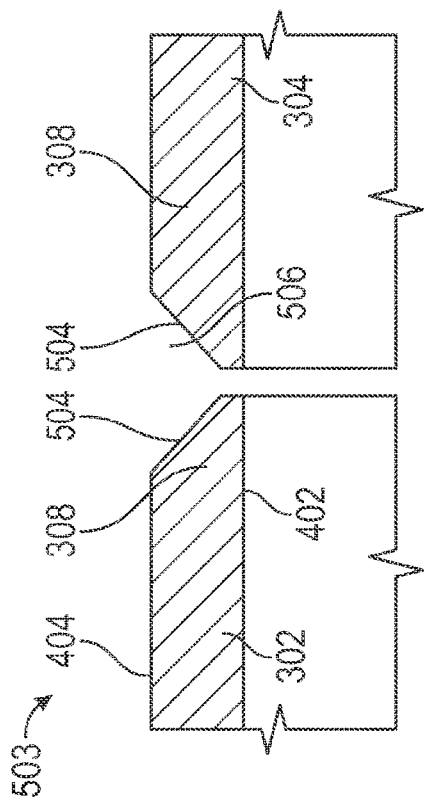
FIG. 5A is a detailed cross sectional view of one example of an end profile of tubes having a J shape.

Referring first to FIG. 5A, the component assembly 501 includes first and second components 302, 304 (e.g., a portion of first and second tubes is shown). The first and second components 302, 304 include the tube exterior surface 404 and tube interior surface 402. In the example shown in FIG. 5A, the end profiles 500 are provided in a J shape, for instance, having a laterally extending taper that opens toward the tube exterior surface 404 from proximate the tube interior surface 402. When the components ends 308 of each of the first and second components 302, 304 are positioned in close proximity to one another, a weld joint 502, for instance, a double J shape weld joint is formed by the end profiles 500.

Figure 5B:
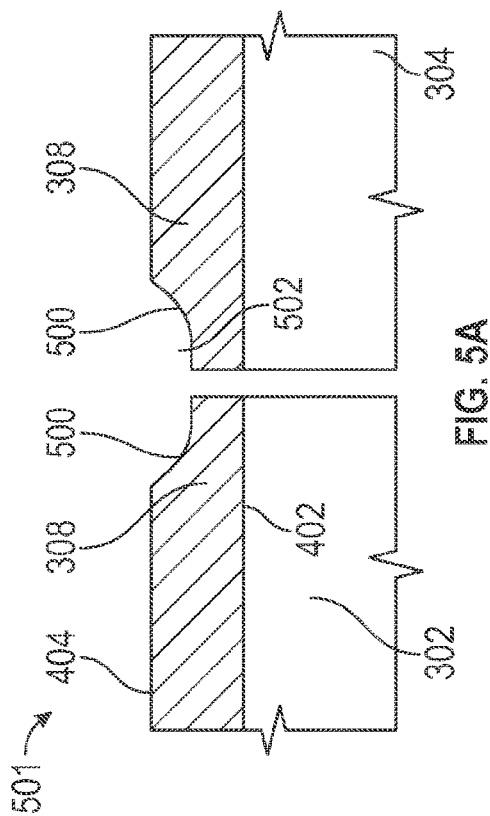
FIG. 5B is a detailed cross sectional view of another example of an end profile of tubes having a V shape.

Referring now to FIG. 5B, a component assembly 503 is shown with the first and second components 302, 304 having the end profiles 504. In this example, the end profiles 504 have an angled taper, for instance, corresponding to a V shape. The end profiles 504 taper upwardly from proximate the tube interior surface 402 toward the tube exterior surface 404. With the first and second components 302, 304 positioned in close proximity to one another, for instance, with the respective component ends 308 provided in the adjoining fashion shown in FIG. 5B, a weld joint 506 is formed. In this example, the weld joint 506 including end profiles 504 is a V shape weld joint.

Figure 5C:
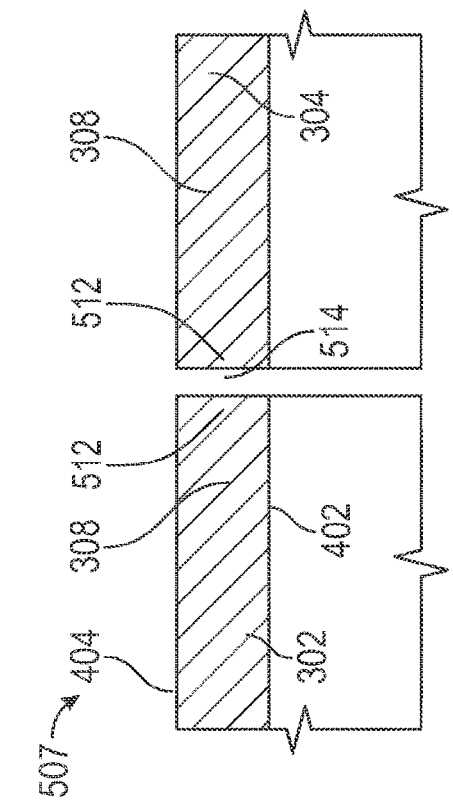
FIG. 5C is a detailed cross sectional view of another example of an end profile of tubes having a U shape.

FIG. 5C shows another example of a component assembly 505 having a U shape weld joint 510. As with the previous examples, the component assembly 505 includes first and second components 302, 304 such as tubes or the like. Each of the components includes component ends 308. In the example shown in FIG. 5C, the component ends include end profiles 508, for instance, having a U shape. The end profiles 508 as shown in FIG. 5C extend in a lateral (though attenuated) fashion similar to the profiles shown in FIGS. 5A, 5B. Accordingly, a weld fusion zone and resulting weld interface including heat affected zones (HAZ) extends in a corresponding lateral fashion similar to the weld interfaces 422 shown in FIG. 4B.

Figure 5D:
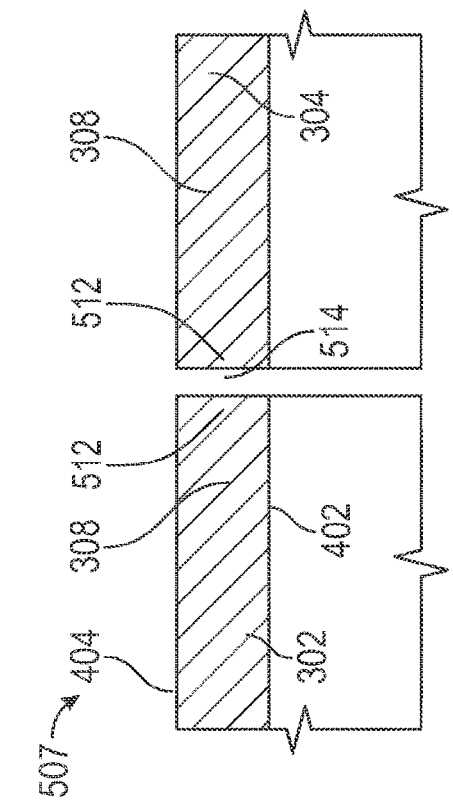
FIG. 5D is a detailed cross sectional view of another example of an end profile of tubes having a square shape.

FIG. 5D shows a differing example of a component assembly 507 providing a butt type weld joint 514 between the first and second components 302, 304. As shown in FIG. 5D, the end profiles 512 are flat or have a square shape and accordingly facilitate the butt joining of the first and second components 302, 304 at their component ends 308. In one example, the weld joint 514 allows for the application of a bead of weld filler therebetween and, in some examples, facilitates the application of multiple passes of the weld filler between the end profiles 512. The weld filler heats and melts the adjacent base material to form a weld fusion zone. Optionally, the weld joint 514 is used in an autogenous weld including weld-cast of the base material (e.g., melted and resolidified base material to form the weld fusion zone). In contrast to previous examples described herein, the weld joint 514 extends in a steep or generally vertical fashion relative to the laterally extending weld joints previously shown, for instance, in FIGS. 5A, 5B and 4B. As will be described herein, the weld joint 514 including, for instance, a butt weld joint as well as the other component assemblies shown in FIGS. 5A, 5B, 5C, 4B are in one example, work hardened with a work hardening mechanism, method or the like described herein including profile work hardening of the weld assembly as well as the end profiles, such as the weld interface 512 of each of the first and second components 302, 304 shown in FIG. 5D. As will be described, by deforming the entirety of the component assembly including, for instance, the component ends 308, the end profiles 512 and the weld fusion zone between the end profiles 512 work hardening is provided in a consistent fashion, for instance, from proximate the tube interior surface 402 to proximate the tube exterior surface 404.

In another example, the end profiles 512 of the weld joint 514 are melted, for instance, during tungsten inert gas (TIG) welding, to form a tapered, laterally extending weld fusion zone similar to the weld fusion zone shown 420 in FIG. 4B. For instance, the base material adjacent the weld joint 514 and proximate the tube exterior surface 404 is melted preferentially (to a larger degree) than the base material proximate the tube interior surface 402. The weld assembly that began with the butt weld joint 514 accordingly assumes a tapered configuration having a weld fusion zone that extends laterally in a manner consistent with at least the weld fusion zone 420. Stated another way, the creation of the weld fusion zone between the end profiles 512 is used to shape weld interfaces into a laterally extending profile (and corresponding stack or sandwich of the fusion zone, interfaces and the base material). Accordingly, even a butt weld joint 514 as shown in FIG. 5D in some examples is configured for work hardening as described herein, including for instance driving of the weld fusion zone into the laterally extending weld interface stacked between the base material and the fusion zone).

In still another example, the end profiles 512 of the weld joint 514 are optionally covered with a weld skirt, as previously described herein. Because the weld interfaces (e.g., end profiles 512) are steep or generally vertical, in one example additional material is included in the weld skirt, for instance, the weld skirt includes one or more of additional lateral coverage (outwardly from the weld recess) or additional height relative to the tube exterior surface 402. Either or both of these changes to the weld skirt provide a more pronounced weld skirt than that shown in other figures herein. The pronounced weld skirt includes additional material for plastic deformation during work hardening. Work hardening of this weld skirt (e.g., into the weld joint 514 and the adjacent weld interfaces) causes extensive plastic deformation in the weld fusion zone and along the weld interfaces, and accordingly consistently and predictably work hardens steep or generally vertical weld assemblies (in addition to the laterally extending weld joints and interfaces of other weld assemblies described herein).

Figure 6:
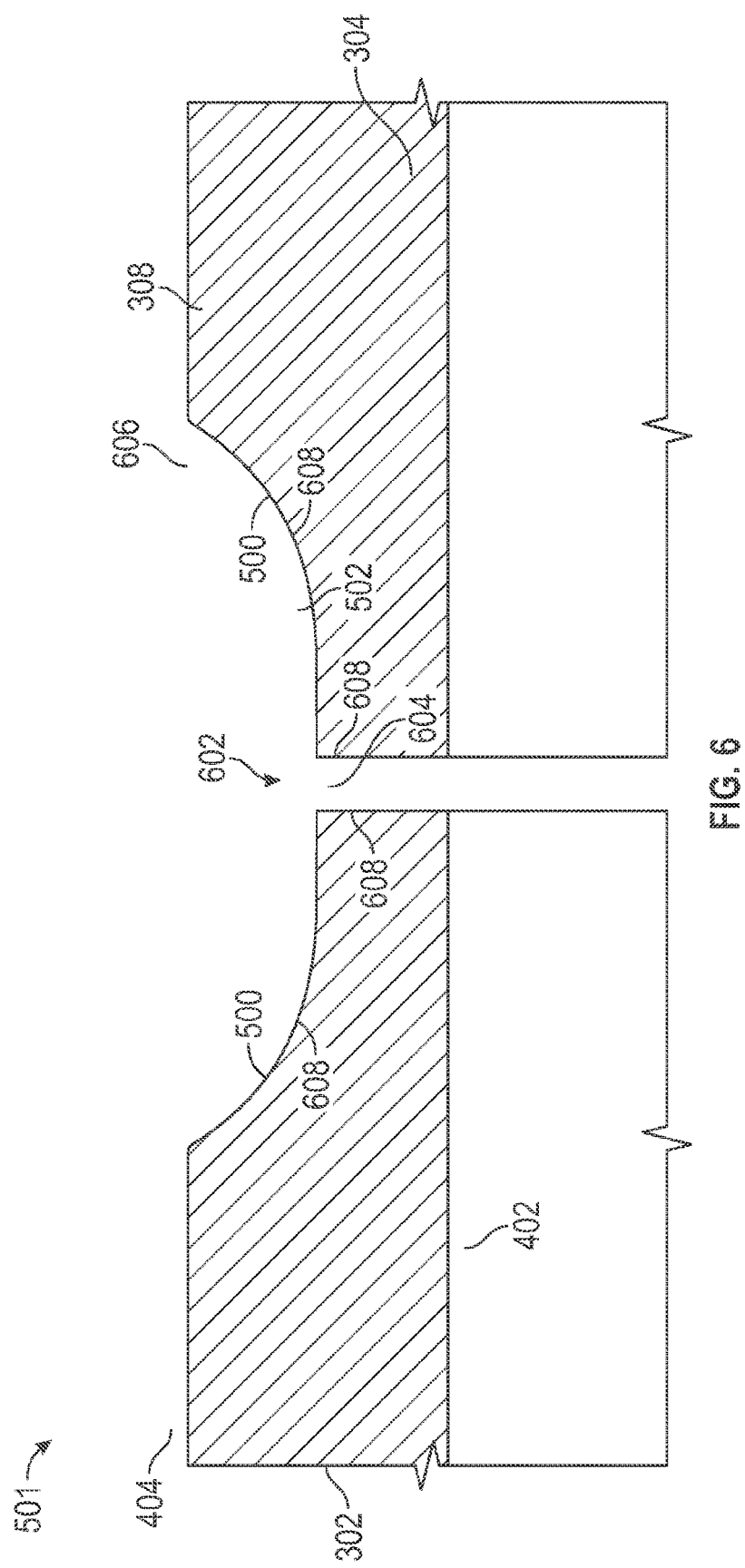
FIG. 6 is a detailed cross sectional view of the tube assembly having the end profile shown in FIG. 5A forming a tapered weld recess.

FIG. 6 shows a detailed view of the cross-sectional component assembly 501 previously shown in FIG. 5A. In this example, the component assembly 501 (e.g., a tube assembly in an example) includes the first and second components 302, 304 tubes in close proximity to one another. As previously described, the end profiles 500 of each of the component ends 308 of the first and second components 302, 304 provides a double J shape weld joint 502. The weld recess 602 of the component assembly 501 follows the contour of the end profiles 500 and accordingly extends in a lateral fashion, for instance, from the recess root 604 to the recess opening 606. As shown in FIG. 6, the recess root 604 is in proximity to the tube interior surface 402 while the recess opening 606 is in proximity to the tube exterior surface 404 (and remote from the tube interior surface 402). In another example, and as previously described herein, one or more of the end profiles such as the end profile 500 or one of the other end profiles shown, for instance, in FIGS. 5B, 5C or the like, are provided along the tube interior surface 402. In this inverse example, the recess root 604 is positioned in proximity to the tube exterior surface 404 while the recess opening 606 is provided in proximity to the tube interior surface 402.

As further shown in FIG. 6, the end profiles 500 form the tapered profile of the weld joint 502 and the weld interfaces 608. The end profiles 500 (and the weld interfaces 608) optionally extend along the recess root 604 proximate to the tube interior surface 402. In this example (an intermediate configuration of the component assembly 501 prior to welding and work hardening), the weld interfaces 608 have mechanical characteristics corresponding to those of the base material of the components 302, 304. For instance where the first and second components 302, 304 include one or more of work hardened stainless steel, duplex stainless steel, super duplex stainless steel, hyper duplex stainless steel, zinc coated nitronic 19D, nickel alloys or the like, the weld interfaces 608, in this example (prior to welding) also have those matching (e.g., identical or substantially similar) characteristics. For instance, the weld interfaces 608 prior to joining at the weld fusion zone include work hardened (unannealed) structure and thereby have similar or identical characteristics to the remainder of the first and second components. These characteristics include, but are not limited to, one or more of yield strength, ultimate strength, hardness, fatigue life or the like.

The component assembly 501 including the end profiles 500 shown in FIG. 6 is the base profile used in the component assembly in each of FIGS. 7A-9 as shown herein. The component assembly 501 is accordingly shown in an intermediate configuration in FIG. 6 and processed as shown in each of the proceeding figures.

Figures 1, 7A:
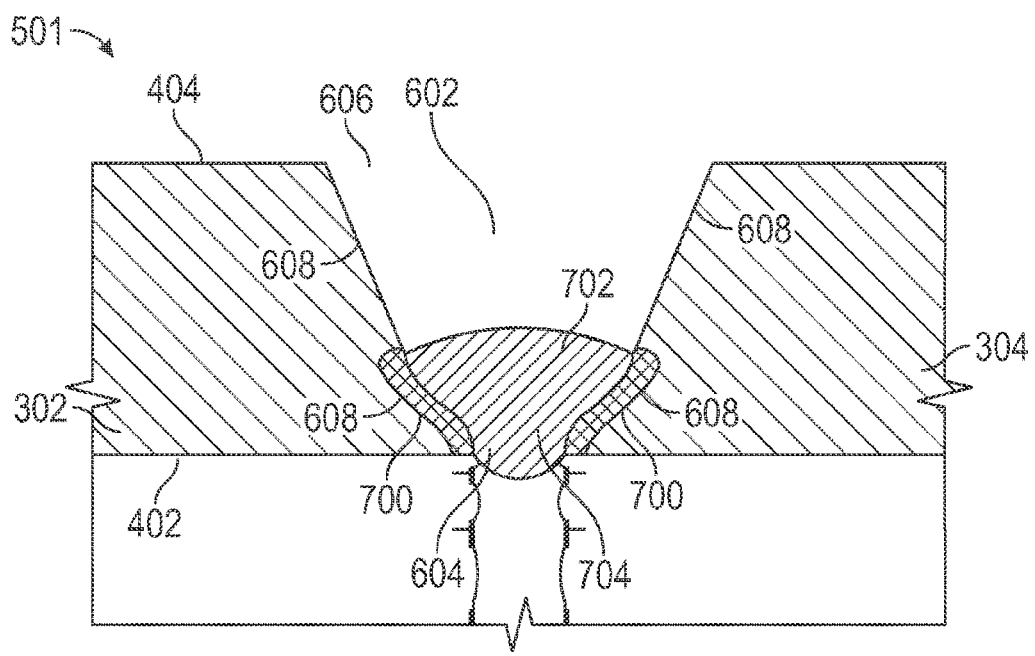
Figures 2, 7A:
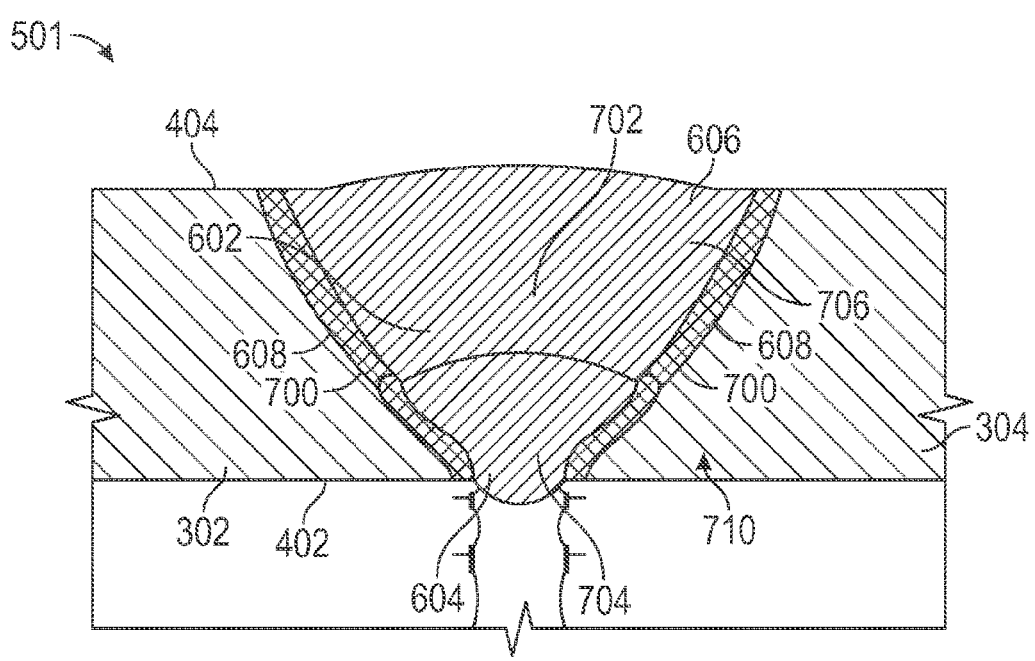

FIG. 7A-1 shows a first intermediate configuration of the component assembly 501. In this intermediate configuration, a weld fusion zone 702 is provided within the weld recess 602, for instance, within the recess root 604 of the recess 602. The weld fusion zone 702 optionally includes an autogenous zone at the recess root 604 or fusion zone including weld filler mixed with molten base material. As shown, the weld fusion zone 702, in this example, is provided as a first pass within the recess root 604 and partially fills the weld recess 602. The remainder of the recess such as the recess opening 606, in this intermediate configuration, remains open. As further shown in FIG. 7A-1, the weld interfaces 608 on each side of the component assembly 501 extend from the recess root 604 laterally toward the tube exterior surface 404. Accordingly, in this example, the component assembly 501 including the weld interfaces 608 extends from proximate the recess root 604 (e.g., also proximate to the tube interior surface 402) to proximate the tube exterior surface 404. In the example shown in FIG. 7A-1, the weld fusion zone 702 extending along the weld interfaces 608 heats the base material of the first and second components 302, 304 and accordingly transitions the base material to a heat affected zone 700. The HAZ 700 extends along the weld interfaces 608 adjacent to the weld fusion zone 702.

As shown in FIG. 7A-2, the weld fusion zone 702 fills the weld recess 602, for instance, to the recess opening 606. In the view shown, the weld fusion zone 702 extends from the recess root 604 proximate to the tube interior surface 402 to proximate the tube exterior surface 404 (e.g., the recess opening 606). Accordingly, in this example the weld recess 602 is filled by one or more passes of the weld fusion zone 702 (e.g., including one or more of weld filler, weld-cast or molten base material or the like). For instance, a supplemental weld portion 706 is provided over the base weld portion 704. The supplemental weld portion 706 includes, but is not limited to, one or more additional passes with the weld fusion zone 702 within the weld recess 602.

As further shown in FIG. 7A-2, the heat affected zone (HAZ) 700 of the base material extends along the weld fusion zone 702 and the weld interface 608. With the weld fusion zone 702 applied within the weld recess 602, the base material at the weld interfaces 608 is annealed (forming HAZ 700) and accordingly the mechanical characteristics of the base material are depressed along the weld interfaces 608. For instance, as previously described herein, one or more of ultimate strength, yield strength, hardness, fatigue life or the like are decreased in the component assembly 501. As previously described herein, the HAZ 700 and the weld interfaces 608 extend laterally, and follow the contour of the weld recess 602 as provided by the end profiles 500 of each of the first and second components 302, 304. The weld fusion zone 702 extends in a complementary and lateral manner, for instance, from the recess root 604 to the recess opening 606. Further, as shown in FIG. 7A-2, the laterally extending weld interfaces 608 and corresponding HAZ 700 are between the weld fusion zone 702 (above) and the unannealed base material of the first and second components 302, 304 (below). For instance, the weld interfaces 608 and HAZ 700 are sandwiched or stacked therebetween.

Optionally, even steep or vertical profiles, such as the end profiles 512 for a butt weld joint 514 (see FIG. 5D) are conditioned to form laterally extending weld interfaces 608 and corresponding laterally extending HAZ 700 (within or part of the interfaces). As previously described herein, the end profiles 512 of the weld joint 514 are melted, for instance, during tungsten inert gas (TIG) welding, to form a tapered weld profile similar to the profiles shown in FIGS. 5A, 5B. For instance, the base material adjacent the weld joint 514 and proximate the tube exterior surface 404 is melted preferentially (to a larger degree) than the base material proximate the tube interior surface 402. Preferential melting of the base material transitions the butt weld joint 514 to a tapered configuration having a weld fusion zone (including weld-cast base material) that extends laterally in a manner consistent with the weld fusion zone 420 shown in FIG. 4B (and other example lateral extending fusion zones provided herein). The remaining solid, but annealed, base material of the weld interfaces has a corresponding lateral contour to the weld fusion zone. Stated another way, the creation of the weld fusion zone between the end profiles 512 shapes weld interfaces in a laterally extending profile. Accordingly, even a butt weld joint 514 as shown in FIG. 5D in some examples is configured for work hardening as described herein (e.g., driving of the weld fusion zone into the laterally extending weld interface having a heat affected zone).

Figure 7B:
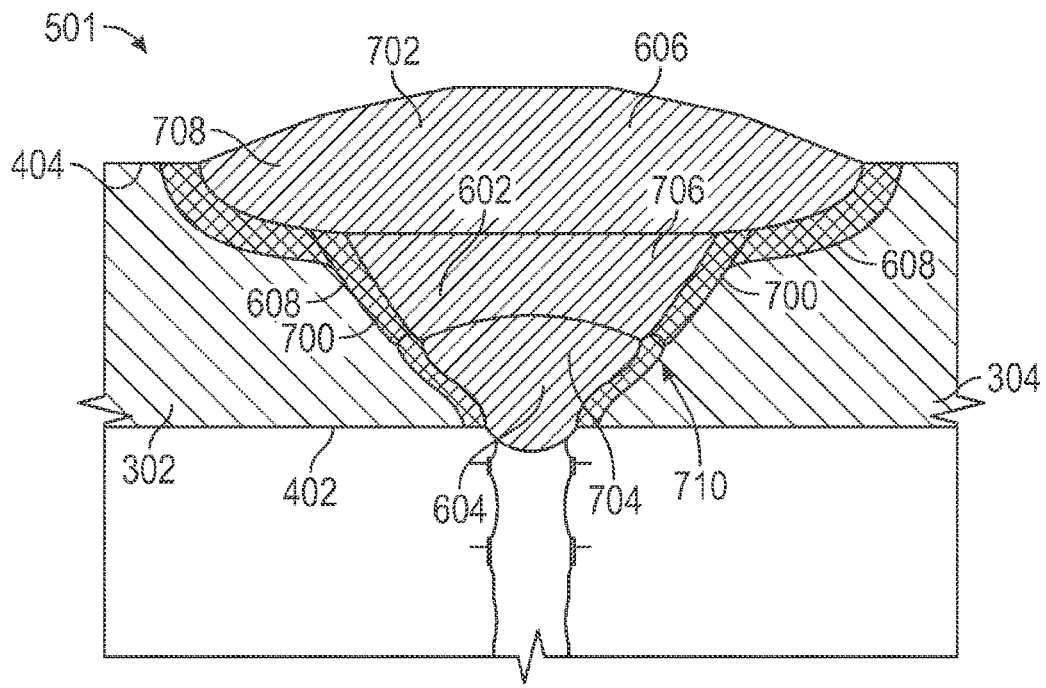
FIG. 7B is a detailed cross sectional view of the tube assembly of FIG. 7A-2 with the weld fusion zone forming a weld skirt over portions of the component tubes proximate the shaped ends of the tubes.

Referring now to FIG. 7B, the component assembly 501 is in another intermediate configuration with an additional portion of the weld fusion zone 702 provided. As shown in FIG. 7B, the additional portion of the weld fusion zone 702 includes a weld skirt 708 over top of the supplemental weld portion 706 and base weld portion 704. In another example, the weld fusion zone 702 is applied in a single step, for instance, with a larger volume of weld filler and molten base material applied to the entirety of the weld recess 602 (e.g., in a single pass) and optionally includes the weld skirt 708.

As shown in FIG. 7B, the weld fusion zone 702 including the weld skirt 708 extends laterally relative to the base weld portion 704 and the supplemental weld portion 706. The weld skirt 708, in one example, follows the contour provided by the weld interfaces 608 formed as previously described herein, for instance, with one or more of a J profile, U profile, V profile or the like. In the example shown in FIG. 7B, the weld skirt 708 projects from one or more surfaces of the component assembly 501. In this example, the weld skirt 708 projects vertically relative to the tube exterior surface 404. In another example, the weld fusion zone 702 projects from the tube interior surface 402, for instance, where the component assembly 501 is reversed with the profile of the weld interfaces 608 extending in a converse manner and taper from the recess root 604 proximate the tube exterior surface 404 toward the recess opening 606 proximate the tube interior surface 402.

Figure 8:
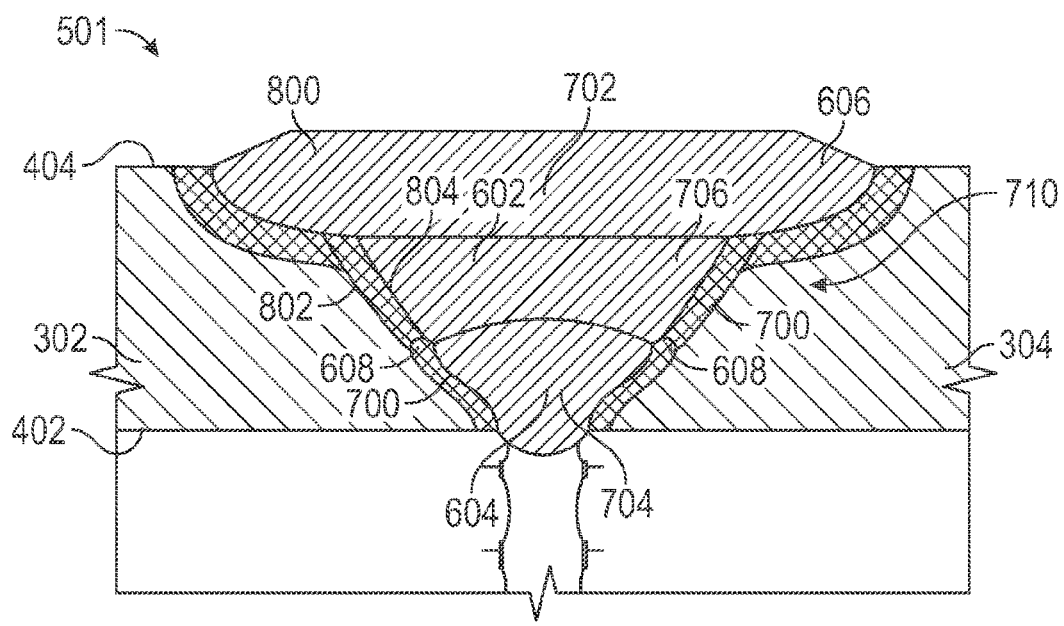
FIG. 8 is a detailed cross sectional view of the tube assembly of FIG. 7B including a shaped weld skirt before work hardening.

FIG. 7A-2 and FIG. 8 show a weld assembly 710 in a complete or near complete configuration prior to work hardening. Because the weld assembly 710 is not work hardened the heat affected zones (HAZ) 700 are provided along the weld fusion zone 702 and within the weld interfaces 608 of the weld assembly 710. Although the weld assembly 710 in the intermediate configuration shown in FIG. 7A-2 does not include the weld skirt shown in FIG. 8, the weld assembly 710 is, in one example, configured for work hardening as described herein (e.g., to provide one or more material characteristics consistent with the base material of the components 302, 304). For instance, in one example, the weld assembly 710 in FIG. 7A-2 is plastically deformed by driving the weld fusion zone 702 into the weld interfaces 608 and the HAZ 700 therein. The weld fusion zone 702 is mechanically deformed to an elevation less than the tube exterior surface 404. For instance, the weld fusion zone 702 is mechanically deformed (e.g., depressed) toward the tube interior surface 402 and the weld interfaces 608. In this example, the plastic deformation of the weld fusion zone 702 drives the weld fusion zone 702 into the HAZ 700, and the weld interfaces 608 including the HAZ 700 are plastically deformed and thereby work hardened.

In contrast to the weld assembly shown in FIG. 7A-2, the weld assembly 710 shown in FIG. 7B includes the weld fusion zone 702 projecting away from the tube exterior surface 404 with a weld skirt 708. In one example, the weld fusion zone 702 in this configuration is mechanically deformed to drive the weld fusion zone 702 into the component assembly 501 and thereby also mechanically deform the underlying weld interfaces 608 including the HAZ 700 therein. As previously described, the deformation of the weld fusion zone 702 deforms the HAZ 700 and work hardens the weld interfaces 608 thereby increasing the mechanical characteristics of the weld assembly 710. In one example, the mechanical characteristics of the weld assembly 710 are increased and, in one example, approach or equal the mechanical characteristics of the base material of the components 302, 304 including work hardened base materials of the components. In other examples, the weld fusion zone 702 including, for instance, the weld skirt 708 as shown in FIG. 7B is deformed into a flush configuration with the tube exterior surface 404. In another example, the weld fusion zone 702 is deformed relative to the intermediate configuration shown in FIG. 7B, for instance, to an elevation between the elevation shown for the weld fusion zone 702 and the tube exterior surface 404 (e.g., projecting from the tube exterior surface 404 to a lesser degree relative to the weld fusion zone 702 as originally shown in FIG. 7B). In still other examples, the weld fusion zone 702 is deformed into a depressed configuration relative to the tube exterior surface 404 (as described with regard to FIG. 7A-2 above). In this example, the weld fusion zone 702 including the weld skirt 708 has a recessed or depressed configuration, for instance, below the tube exterior surface 404.

FIG. 8 shows another example intermediate configuration of the component assembly 501 including the weld assembly 710. In this example, the component assembly 501 includes a shaped weld skirt 800. For instance, the weld fusion zone 702 such as the projecting portion of the weld skirt 708 shown in FIG. 7B is processed (e.g., by machining or the like) to provide the weld fusion zone 702 at a consistent elevation relative to the tube exterior surface 404. In some examples, the weld skirt 708 is shaped to a specified height, for instance, the height shown in FIG. 8. Work hardening of the weld fusion zone 702 including the shaped weld skirt 800 from the elevation or specified height shown in FIG. 8 to a flushed configuration or other height relative to the tube exterior surface 404 (e.g., including above or below the tube exterior surface) is configured to increase the mechanical characteristics of the weld assembly 710 including the weld fusion zone 702 and the weld interfaces 608 to characteristic values that are proximate to, equal to, greater than or approaching the mechanical characteristics of the base material, for instance, of work hardened components 302, 304.

In one example, the specified height of the shaped weld skirt 800 corresponds to a height dimension previously determined, for instance, by way of lookup tables, empirical testing or the like that when plastically deformed (e.g., to a flush configuration as in FIG. 9) increases the mechanical characteristics of the weld assembly 710 to values proximate those of the base material. That is to say, in one example, deformation of the weld fusion zone 702 from the elevated position shown with a shaped weld skirt 800 to a flush configuration achieves one or more mechanical characteristics with the weld assembly 710 approaching or proximate to those of the base material. By plastically deforming the weld fusion zone 702 having the specified height the mechanical characteristics of the weld assembly 710 are consistent in the weld assembly because the deformation (in this case a decrease in elevation) is consistent.

FIG. 9 shows one example of a completed work hardened weld assembly 900. In this example, the weld fusion zone 702 is work hardened relative to the configuration previously shown in FIG. 8. For instance, the weld fusion zone 702 having the shaped weld skirt 800 is plastically deformed and driven into the component assembly 501. In this example, the weld fusion zone 702 is flush with the tube exterior surface 404. As shown in FIG. 9, forces applied to the component assembly 501, for instance, at the weld assembly 900 are shown with solid arrows. In this example, mechanical deformation is initiated along the tube exterior surface 404, for instance, in a localized manner relative to the weld assembly 900. In other examples, deformation is also provided in an opposed direction, for instance, from the interior of the component assembly 501 along the tube interior surface 404. In this example (shown with the dashed arrows), one or more of support, additional force (including force provided by interior based work hardening tools) or the like is applied along the tube interior surface 404 to accordingly support the component assembly 501 and provide a base to the component assembly 501 during plastic deformation of the weld fusion zone 702, weld interfaces 608 and the like. In an example having one or more of support or additional forces (including opposed work hardening) provided along the tube interior surface 404, the work hardening depression 904 or inward deformation shown in FIG. 9 is absent. Instead, the tube interior surface 404 has a substantially isodiametric configuration extending from left to right in FIG. 9.

In the example shown in FIG. 9, the weld fusion zone 702, weld interfaces 608 and the like are, in one example, plastically deformed with force applied along the tube exterior surface 404. As previously described, the first and second components 302, 304 underlying the weld fusion zone 702 and the weld interfaces 608 (e.g., in a stack, sandwich or the like) are constructed with base materials having enhanced mechanical characteristics including one or more of ultimate strength, yield strength, hardness, fatigue life or the like. These robust materials provide the base or support for the weld fusion zones 702 and the weld interfaces 608 during plastic deformation caused, for instance, by forces applied along the tube exterior surface 404. In this example, the work hardening depression 904 shown in FIG. 9, is optionally included with the component assembly 501.

The weld fusion zone 702 shown in FIG. 9 is provided in a graduated configuration and extends laterally, for instance, from the recess root 604 to one or more edges of the recess opening 606 within the weld recess 602. As previously described, the weld recess 602 is bounded by the end profiles of the components 302, 304 (e.g., one or more of the profiles described herein or the like) and recess and weld interfaces 608 extend laterally. Accordingly, the HAZ 700 (shown in FIG. 8 prior to work hardening) also extends laterally relative to the weld fusion zone 702 and the weld recess 602. In this laterally extending configuration the weld interfaces 608 are a weld bed for the weld fusion zone 702. The weld interfaces 608 (e.g., weld bed) include one or more of weld bed floors 802, for instance, extending laterally and over the unannealed base material of the components 302, 304, and weld bed ceilings 804 extending laterally and under the weld fusion zone 702. In this configuration shown originally in FIG. 8 and shown again in FIG. 9, the weld fusion zone 702, the weld interfaces 608 and the base material of the underlying first and second components 302, 304 form a stacked configuration and accordingly sandwich the weld interface 608 as well as the HAZ 700 (shown in FIG. 8) therebetween. As force is applied (as shown in FIG. 9) transverse to the stacked layers of the weld fusion zone 702, weld interfaces 608 and the underlying base material of the components 302, 304 the weld fusion zone 702 is driven into the sandwiched weld interfaces 608. The plastic deformation transmitted through the weld fusion zone 702 and continued into the weld interfaces 608 work hardens both the weld fusion zone 702 and the laterally extending weld interfaces 608 including the HAZ 700 therein. Because the weld interfaces 608 extend laterally (e.g., from proximate the recess root 604 to proximate the recess opening 606) deformation of the weld fusion zone 702 is reliably transmitted to the weld interfaces 608 to plastically deform the HAZ 700 (shown in FIG. 8) in a distributed manner in contrast to a local manner with vertical or steep angled weld interfaces 410 (e.g., proximate the surfaces 402, 404 as shown in FIG. 4A). The weld interfaces 608 of the work hardened weld assembly 900, for instance interface segments extending from proximate the recess root 604 to proximate the recess opening 606, are consistently and predictably work hardened. In one example, the work hardened weld assembly 900 shown in FIG. 9 including, but not limited to, the weld fusion zone 702, the weld interfaces 608, as well as the surrounding base material of the components 302, 304 underlying and adjacent to the weld interfaces 608 includes a work hardened mechanical characteristic (e.g., yield strength, ultimate strength, fatigue life or the like) proximate that of the base material (e.g., within one or more of 1,000 or less, 2,000 or less, 4,000 or less, 6,000 or less, 8,000 or less psi of the base material). In another example, the work hardened weld assembly 900 has enhanced mechanical characteristics proximate to the base material as opposed to significant variation between other weld assemblies and the base material (e.g., as in the example shown in FIG. 4A), for instance, variations of around 30,000 psi in one or more mechanical characteristics, such as yield strength or the like.

In one example, the work hardened weld assembly 900 further includes one or more heat affected beads 902, for instance, provided at the edge of the weld assembly 900. These heat affected beads 902 are, in one example, provided in the weld interfaces 608 and beyond the edges of the weld fusion zone 702. Because the weld fusion zone 702 heats and thereby anneals adjacent base material of the first and second components 302, 304, the heat affected beads 902 constitute a minimal portion (e.g., incidental portion) of the base material that remains heat affected or annealed at the edges of the weld assembly 900 after work hardening as described herein. The heat affected bead 902 is at the edge of the weld fusion zone 702 while the remainder of the work hardened weld assembly 900 extends from proximate the tube exterior surface 404 to proximate the tube interior surface 404. For instance, an interface segment of the weld interface 608 (not including the heat affected bead 902) extends from proximate the exterior surface 404 to proximate the interior surface 404 to provide enhanced characteristics to each of the weld interfaces 608 and thereby enhance the overall strength of the work hardened weld assembly 900. The heat affected bead 902 thereby constitutes an incidental decrease in mechanical characteristics relative to the base material while the remainder of the work hardened weld assembly 900, including the weld fusion zone 702 as well as the weld interface 608 extending from proximate the tube exterior surface 404 to proximate the interior surface 404, are all work hardened and accordingly have mechanical characteristics approaching (including equaling, near to, proximate or the like) those of the base material.

FIGS. 10A-F show another example of a component assembly 1000 including a work hardened weld assembly (or intermediate configurations of the assembly as the weld assembly is formed). As shown herein, the component assembly 1000 is plastically deformed during work hardening through deformation of both of the first and second components 1002, 1004, for instance, their component ends 1012 in addition to one or more features of the weld assembly including the weld filler, HAZ or the like.

Figure 10A:
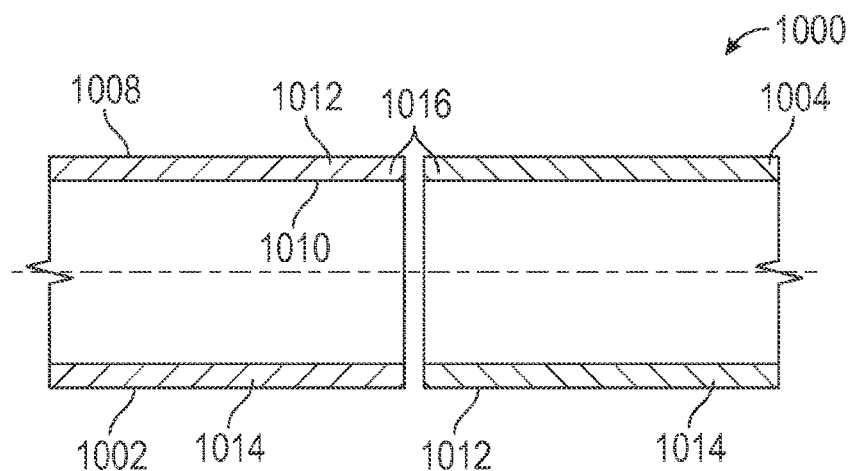
FIGS. 10A-F are cross sectional views of another example of a tube assembly in stages of forming a weld assembly.

Referring first to FIG. 10A, the first and second components 1002, 1004 are shown in proximity with each of the component ends 1012 aligned with the other. As shown, the first and second components 1002, 1004 include at least some similar features to the previously described first and second components 302, 304 described herein. For instance, in this example, the first and second components 1002, 1004 are tubes and include tube exterior surfaces 1008 (e.g., in one example, an outer diameter, interior diameter or the like) and a tube interior surface 1010 (e.g., an inner diameter, interior diameter or the like). The component assembly 1000 is further shown with end profiles 1016 matching overall profiles 1014 of the remainder of the first and second components 1002, 1004. In one example, the overall profile 1014 is a consistent profile, for instance the shape, size, diameter or the like of the first and second components 1002, 1004 remains the same between ends of each of the components. At least portions of the end profiles 1016 in FIG. 10A are similar to and provide a butt joint like the end profiles 512 show in FIG. 5D. In the examples shown in FIGS. 10A-F the end profiles 1016 further include portions of the components 1002, 1004 proximate to the ends, for instance the portion of the components deformed in FIGS. 10B, 10C or the like).

Figure 10B:
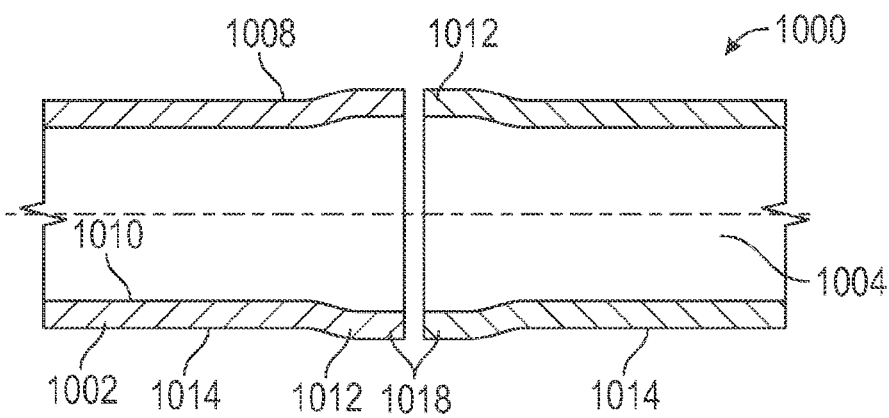

FIG. 10B shows an intermediate configuration of the component assembly 1000. In this example, the component assembly 1000 includes the component ends 1012 having varied end profiles 1018 relative to the overall profile 1014 of the first and second components 1002, 1004. As shown in FIG. 10B, the varied end profile 1018, in this example, includes a flared or enlarged profile relative to the overall profile 1014 (and the end profiles 1016 shown in FIG. 10A). In other examples, the varied end profile 1018 includes, but is not limited to, one or more of a shrunk end profile, a noncircular profile (relative to a base circular overall profile) or the like. In still other examples, the varied end profile 1018 includes one or more of narrowing, corrugations or the like configured to provide a different shape to the end profile 1018 relative to the overall profile 1014. In still other examples, the varied end profile 1018 is the initial configuration of the component ends 1012 of the first and second components 1002, 1004. In this example, the previous configuration shown, for instance, in FIG. 10A of the component assembly 1000 is absent. Instead, the first and second components 1002, 1004 are provided in the varied profile shown herein, for instance, with the varied end profile 1018 relative to the overall profile 1014.

Figure 10C:
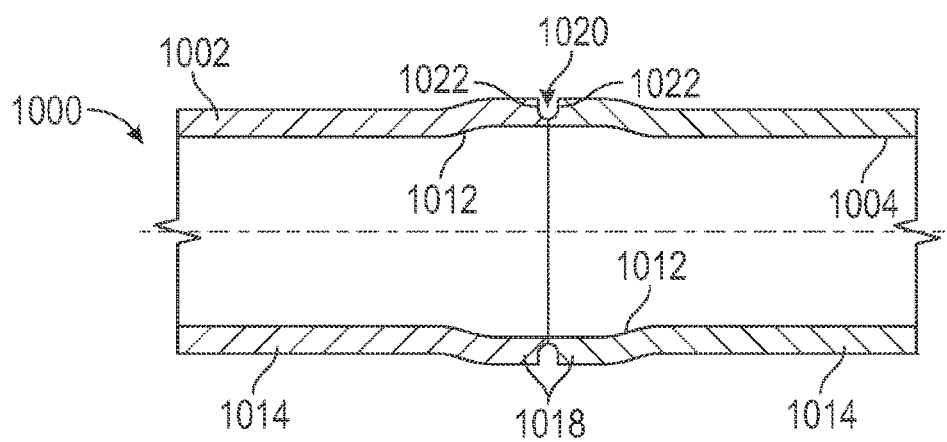

FIG. 10C shows another intermediate configuration with a prepared weld joint 1020. In this example, the weld joint 1020 corresponding to a portion of the component ends 1012 is prepared for welding to connect the first and second components 1002, 1004 end-to-end. In this example, the weld interface 1022 of the weld joint 1020 includes one or more of the profiles described herein including, but not limited to, a U-shaped weld interface, a V-shaped weld interface, a J-shaped weld interface, a butt weld shaped weld interface 1022 (e.g., see FIGS. 5A-D), other weld interfaces including vertical or steep angled weld interfaces or the like (e.g., see FIG. 4A). Optionally, the component ends 1012 forming the weld joint 1020 are prepared, for instance, by way of one or more of forming, machining or the like to provide the specified weld interfaces 1022.

Figure 10D:
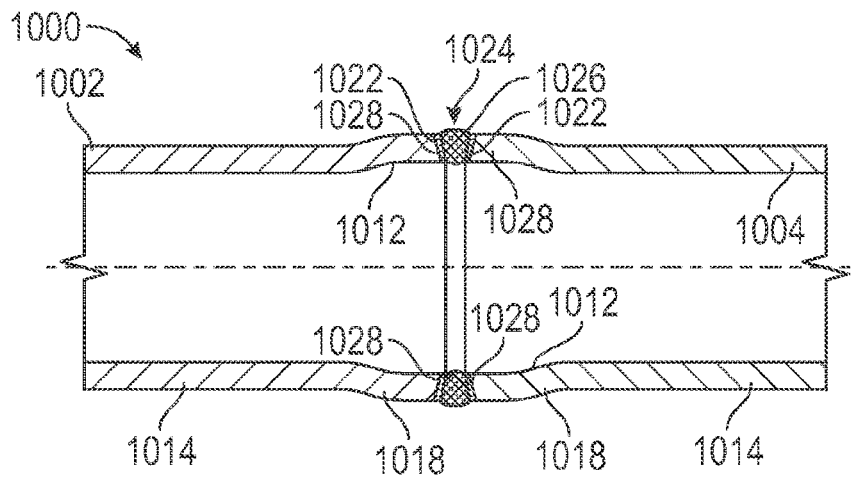

FIG. 10D shows the component assembly 1000 with the weld assembly 1024. A weld filler 1026 is provided in a corresponding weld recess formed by the weld interfaces 1022 previously described and shown, for instance, in FIG. 10C. As shown, the weld filler 1026, in this example, projects from the first and second components 1002, 1004, for instance, form those portions of the tube exterior surfaces 1008 within the varied end profile 1018.

As further shown in FIG. 10D, the weld assembly 1024, in this example, includes heat affected zones (HAZ) 1028 adjacent to the weld filler 1026. The HAZ 1028 is coincident with and included with the weld interfaces 1022. As previously described, the application of the heated weld filler 1026 to the weld interfaces 1022 anneals the base material of the first and second components 1002, 1004 along the weld interfaces 1022 (that is not otherwise melted and included in the fusion zone 1026). The annealing of the base material at the weld assembly 1024 creates a local weakness within the component assembly 1000 relative to the overall mechanical characteristics of the base material of the components 1002, 1004. For instance, as previously described, one or more of ultimate strength, yield strength, hardness, fatigue life or the like are decreased because of heating of the weld interfaces 1022 caused by the weld fusion zone 1026 to form the HAZ 1028.

Figure 10E:
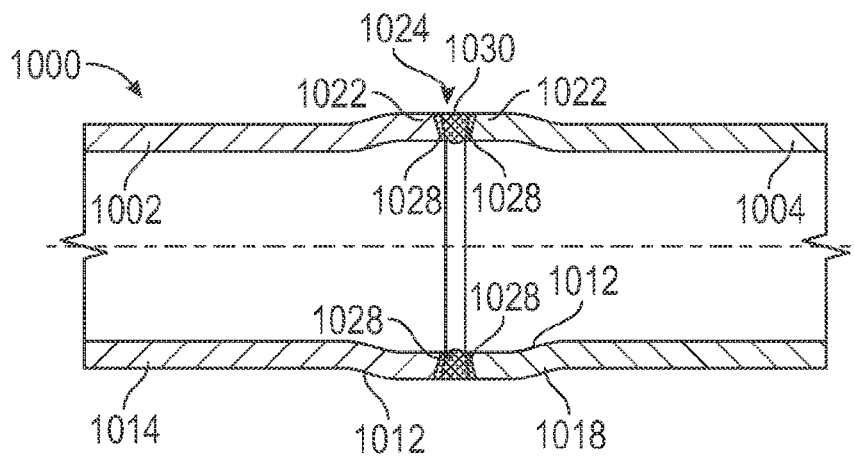

The component assembly 1000 is shown again in FIG. 10E. In this example, the weld fusion zone 1026 previously shown in FIG. 10D is optionally shaped, for instance, by machining into the shaped weld fusion zone 1030. As shown, the shaped weld fusion zone 1030, in this example, is substantially flush with the remainder of the component ends 1012 of the first and second components 1002, 1004. The component ends 1012 maintain the varied end profile 1018 relative to the overall profile 1014 of the components 1002, 1004. The shaping of the weld fusion zone 1030 shown in FIG. 10E is optional. In other examples, the weld fusion zone 1026 projecting from the weld assembly 1024 is maintained, for instance, to facilitate enhanced work hardening of one or more features of the weld assembly as described herein (e.g., with localized deformation of both the weld fusion zone 1026 and laterally extending and underlying weld interfaces).

Figure 10F:
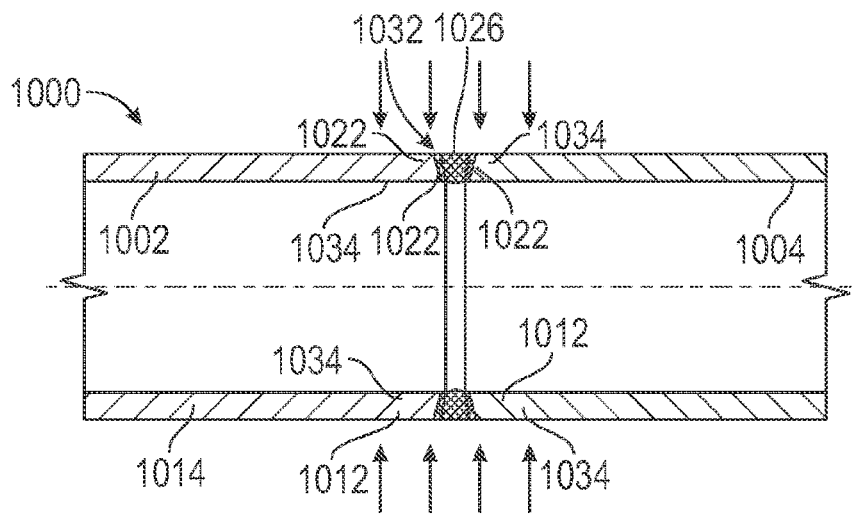

FIG. 10F shows the work hardened weld assembly 1032 including the component ends 1012 having a deformed end profile 1034 relative to the varied end profile 1018 previously shown in FIGS. 10D and 10E. In the example shown in FIG. 10F, the deformed end profile 1034 matches the overall profile 1014. In other examples, the deformed end profile 1034 does not match the overall profile 1014 but does otherwise vary relative to the varied end profile 1018 shown in FIG. 10E. For instance, the deformed end profile 1034 is depressed relative to the overall profile 1014, enlarged relative to the overall profile 1014 and smaller than the original varied end profile 1018, includes a different shape or sized compared to the varied end profile 1018 or the like.

The plastic deformation of the component ends 1012 including the weld fusion zone 1026 and weld interfaces 1022 enhances the mechanical characteristics and correspondingly forms the work hardened weld assembly 1032. As previously described with regard to other examples of a work hardened weld assembly, the work hardened weld assembly 1032 shown in FIG. 10F includes enhanced mechanical characteristics relative to other weld assemblies described herein. For instance, the work hardened weld assembly 1032 includes one or more mechanical characteristics such as ultimate strength, yield strength, hardness, fatigue life or the like approaching the mechanical characteristics or matching the mechanical characteristics of the base material of the first and second components 1002, 1004.

In this example, the mechanical deformation of the component ends 1012 in contrast to the localized mechanical deformation of a weld assembly (e.g., shown in FIG. 9) plastically deforms the entire region around the work hardened weld assembly 1032 as well as the weld assembly 1032 itself. Accordingly, while the weld fusion zone 1026 and the weld interfaces 1022 may in some examples have a vertical or steep profile relative to the previously described weld assemblies provided herein, because the entirety of the component ends 1022 adjacent to the work hardened weld assembly 1032 are plastically deformed, the mechanical characteristics of the end profile including the weld assembly 1032 are improved. The work hardened weld assembly 1032 including the distributed work hardening shown in FIGS. 10A-F provides mechanical characteristics similar to those of the work hardened weld assembly 900 shown, for instance, in FIG. 9.

With the example weld assembly 1032 mechanical characteristics at the weld assembly 1032 are enhanced even with minimal preparation of the weld joint 1020 (e.g., a butt joint). For example, the weld joint 1020 instead of having the laterally extending weld interface 1022 shown (e.g., a U-shape, J-shape, V-shape or the like) is a substantially vertical or steep interface, such as a butt weld interface or deep U-shape weld interface. For instance, with a butt weld interface, the varied end profiles 1018 of the component ends 1012 are mated in a surface-to-surface manner, and in one example, a weld fusion zone 1026 is formed therebetween. By work hardening the entirety of the weld assembly including, for instance, the adjacent portions of the component ends 1012 having the varied end profiles 1018, the weld assembly including the weld fusion zone 1026 and weld interfaces 1022 having a flat (vertical) or steep configuration, are similarly work hardened to provide one or more mechanical characteristics proximate to the mechanical characteristics of the base material of the first and second components 1002, 1004.

In still other examples, the work hardened weld assembly 1032 includes an autogenous weld. The autogenous weld assembly includes the material of the first and second components 1002, 1004 at the ends heated to fuse the components without a separate weld filler. In this example, because the end profile is deformed from the varied end profile 1018, for instance, to the deformed end profile 1034 or another profile different than the varied end profile 1018, the entirety of the weld assembly including the weld interfaces 1022 and the fused material of the first and second components are all work hardened. Accordingly, even annealed portions of the components 1002, 1004 used to provide an autogenous weld therebetween are consistently and reliably work hardened through plastic deformation of the end profiles 1018 to the deformed end profiles 1034 without the application and deformation of a weld filler.

Figure 11:
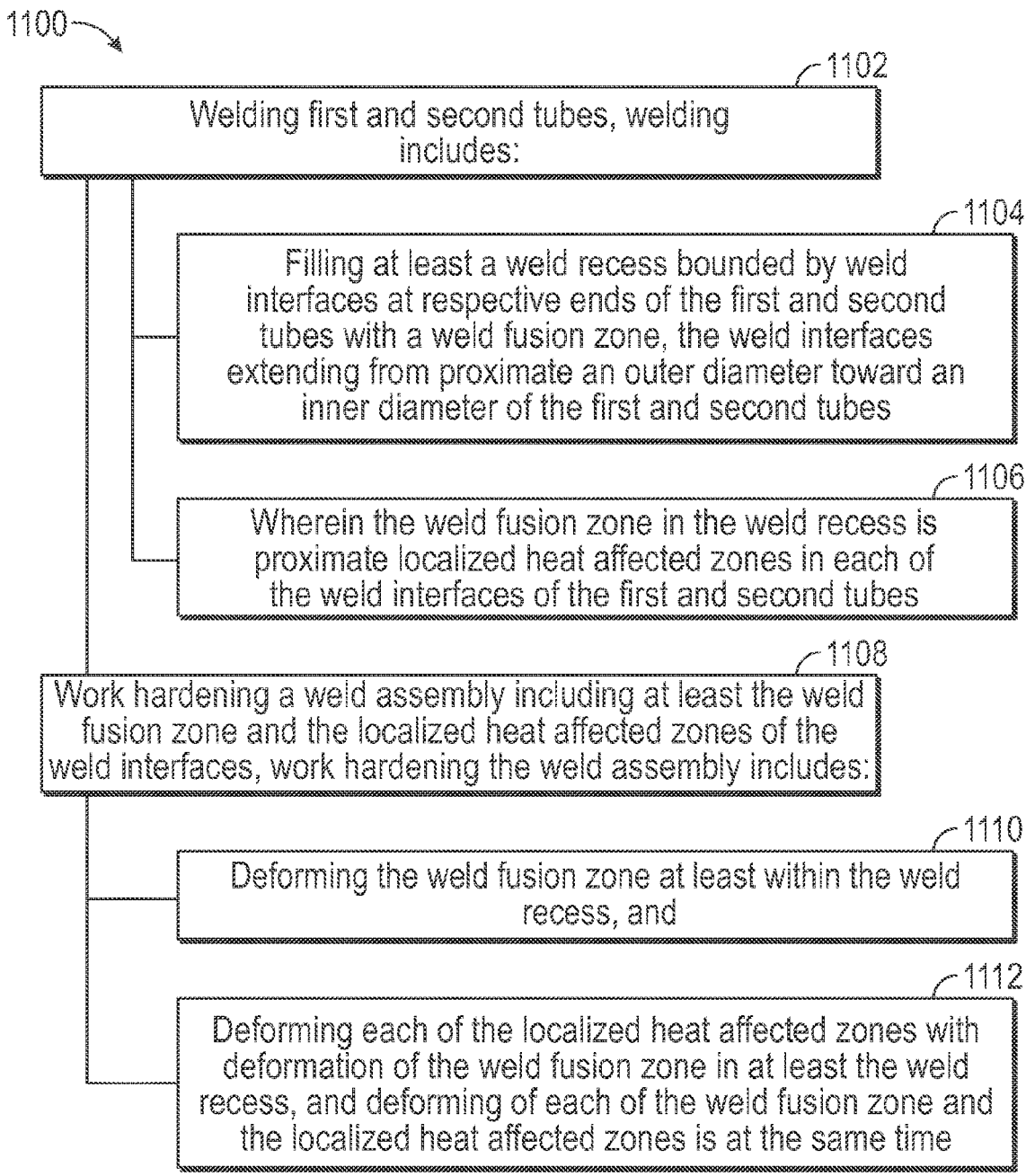
FIG. 11 is a block diagram showing one example of a method for connecting at least first and second tubes.

FIG. 11 shows one example of a method 1100 for connecting at least first and second components, such as tubes. In describing the method 1100 reference is made to one or more components, features, functions or the like described herein. Where convenient reference is made to the components, features functions or the like with reference numerals. Reference numerals provided are exemplary and are not exclusive. For instance, the features, components, functions or the like described in the method 1100 include, but are not limited to, the corresponding numbered elements, other corresponding features described herein, both numbered and unnumbered as well as their equivalents.

At 1102, first and second components 302, 304, such as tubes are welded together. In one example, welding includes at 1104 filling a weld recess 602 bounded by weld interfaces 608, for instance along each of the ends of the first and second components. As shown in FIGS. 6, 7A-1, 7A-2 (as examples) the weld interfaces 608 extend from proximate an outer diameter toward an inner diameter of the components 302, 304. In one example, the weld interfaces form a weld bed and extend laterally from a bed root near a recess root 604 of the weld recess 602 to a bed opening (proximate one of the inner or outer diameter). The weld fusion zone 702 in the weld recess 602 is proximate to the localized heat affected zones 700 in each of the weld interfaces 608 (e.g., at 1106 in FIG. 11). As described herein, the weld fusion zone 702 heats and anneals the weld interfaces 608 to form the HAZ.

At 1108, the method 1100 includes work hardening a weld assembly 710 (e.g., shown in FIG. 7B or 8), for instance to the work hardened weld assembly 900 shown in FIG. 9. As described herein, in one example the weld assemblies 710, 900 include the weld fusion zone 702 and the weld interfaces 608. In other examples described herein the weld assemblies include an autogenous weld (e.g., the weld interfaces are heated and fused together). At 1110, the weld fusion zone 702 is deformed at least within the weld recess 602. As described herein, deformation of the weld fusion zone 702 includes deformation of a weld skirt 708 or 800 in other examples. At 1112 each of the HAZ 700 are deformed according to deformation of the weld fusion zone 702. For instance, the weld fusion zone 702 is driven by plastic deformation into the weld interfaces 608 and thereby plastically deforms the weld interfaces 608 to minimize (e.g., decrease or eliminate) the HAZ 700.

Several options for the method 1100 follow. In one example, deforming each of the localized heat affected zones 700 includes deforming the weld fusion zone overlying the localized heat affected zones. In another example, the localized heat affected zones 700 are between the weld fusion zone 702 and a base material of the first and second components 302, 304 (see FIGS. 7B and 8). Deforming each of the localized heat affected zones 700 in this example includes deforming the weld fusion zone 702 toward the localized heat affected zones 700.

Optionally, work hardening the weld fusion zone 702 and the localized heat affected zones 700 includes supporting the base material of the first and second tubes 302, 304 along the inner diameter of the first and second tubes (e.g., with a mandrel, opposed inner work hardening tool or the like). In another example, work hardening the weld fusion zone 702 and the localized heat affected zones 700 of the weld interfaces 608 includes work hardening the weld fusion zone 702 and the localized heat affected zones 700 continuously from proximate a tube outer surface 404 (e.g., an outer diameter) to proximate a tube inner surface 402 (e.g., an inner diameter). In an additional example, work hardening the weld fusion zone 702 and the localized heat affected zones 700 of the weld interfaces 608 includes work hardening the weld fusion zone 702 and the localized heat affected zones 700 continuously from the outer diameter to the inner diameter.

In another example, the first and second components 302, 304, such as tube, include a base material having a specified strength (e.g., a yield strength of 90,000 psi or more). In this example, work hardening the weld assembly 710 includes work hardening the weld assembly 710 to a work hardened strength proximate to the specified strength of the base material (e.g., a strength proximate to 90,000 psi or within 10,000 psi or less of the specified strength of the base material).

In other examples, the method 1100 includes tapering the weld interfaces 608 at the respective ends of the first and second tubes 302, 304 from proximate the outer diameter to proximate the inner diameter, and the weld recess 602 includes a tapered weld recess corresponding to the tapered weld interfaces 608. The method 1100 optionally includes filling the tapered weld recess with a base weld portion (e.g., 704 and optionally 706) of the weld fusion zone 702, and covering the weld fusion zone 702 and portions of the first and second tubes 302, 304 proximate the outer diameter (e.g., tube outer surface 404) with a weld skirt 708, 800. In this example, deforming the weld fusion zone 702 within the weld recess 602 includes deforming the base weld portion (e.g., 704, 706) and the weld skirt 708 (or 800).

Optionally, the weld skirt 800 extends above the outside diameter (e.g., the tube outer surface 404) of the first and second tubes 302, 304 a specified height. Deforming the base weld portion and the weld skirt includes deforming the weld skirt 800 to a flush configuration relative to the outside diameter (e.g., the tube outer surface 404) from the specified height. Deforming the weld skirt 800 to the flush configuration from the specified height increases the strength of the weld assembly 900 including the weld fusion zone 702 and the weld interfaces 608 having the localized heat affected zones 700 to a work hardened strength proximate a specified strength of a base material of the first and second tubes. In one example, the weld skirt 708 shown in FIG. 7B is shaped (e.g., machined or the like) into a planar configuration having the specified height.

In another example, the method 1100 includes changing an end profile 1016 of the respective ends of the first and second tubes 1002, 1004 relative to an overall profile 1014 of the tubes. For instance, the end profiles 1016 shown in FIG. 10A are changed to a varied end profile having a different shape, size or the like relative to the overall profile 1014. In the examples shown in FIGS. 10B and 10C the varied end profile 1018 is enlarged relative to the overall profile 1014. In other examples, the end profile is decreased or provided with a different shape. Work hardening the weld assembly 1024 in this example includes deforming the end profile 1016 of the first and seconds tubes relative to the variable end profile (e.g., the profile 1018 shown in FIG. 10C or other varied profiles). For instance, the variable end profile 1018 is deformed to have a profile matching the overall profile 1014. In another example, the variable end profile 1018 is deformed to have a profile different from each of the overall profile 1014 and the preceding variable end profile.

VARIOUS NOTES

Example 1 can include subject matter such as a tube assembly comprising: at least a first tube and a second tube configured for coupling at respective ends, the first and second tubes each include: a base material having a specified mechanical characteristic, and a weld interface at the respective end, the weld interface is proximate to an inner diameter and an outer diameter of the first and second tubes, and includes a weld interface segment extending therebetween; and a work hardened weld assembly coupling the base material of each of the first and second tubes, the work hardened weld assembly includes: a weld fusion zone between the weld interfaces of the first and second tubes, the weld fusion zone extends between the inner and outer diameters, the weld interface segments of the first and second tubes, and wherein the weld fusion zone is work hardened and at least the weld interface segments of the first and second tubes are work hardened between the work hardened weld fusion zone and the base material of the first and second tubes.

Example 2 can include, or can optionally be combined with the subject matter of Example 1, to optionally include wherein the weld interface segments are work hardened continuously from proximate the outer diameter to proximate the inner diameter of the first and second tubes.

Example 3 can include, or can optionally be combined with the subject matter of one or any combination of Examples 1 or 2 to optionally include wherein the first and second tubes each include a heat affected bead of the weld interface spaced from the weld fusion zone.

Example 4 can include, or can optionally be combined with the subject matter of one or any combination of Examples 1-3 to optionally include wherein the specified mechanical characteristic includes a specified strength, and the work hardened weld assembly, including at least the weld fusion zone and the weld interface segments, includes a work hardened strength proximate to the specified strength of the base material.

Example 5 can include, or can optionally be combined with the subject matter of one or any combination of Examples 1-4 to optionally include wherein the weld fusion zone includes: a base weld portion extending along the weld interfaces between the inner and outer diameters, and a weld skirt extending over portions of the first and second tubes proximate the weld interfaces.

Example 6 can include, or can optionally be combined with the subject matter of Examples 1-5 to optionally include wherein the weld skirt extends over at least a portion of the weld interfaces proximate the outer diameter of the first and second tubes.

Example 7 can include, or can optionally be combined with the subject matter of Examples 1-6 to optionally include wherein the work hardened weld assembly includes a tapered weld recess bounded by the weld interfaces, and the tapered weld recess tapers from a recess root proximate the inner diameter of the first and second tubes to a recess opening proximate the outer diameter of the first and second tubes.

Example 8 can include, or can optionally be combined with the subject matter of Examples 1-7 to optionally include wherein the work hardened weld assembly includes a tapered weld recess bounded by the weld interfaces, and the tapered weld recess tapers from a recess root proximate the outer diameter of the first and second tubes to a recess opening proximate the inner diameter of the first and second tubes.

Example 9 can include, or can optionally be combined with the subject matter of Examples 1-8 to optionally include wherein the weld interface segments are included in a weld bed extending laterally from proximate the inner diameter to proximate the outer diameter, the weld bed includes: a weld bed ceiling extending along the weld fusion zone, and a weld bed floor extending along the base material of the respective first and second tubes.

Example 10 can include, or can optionally be combined with the subject matter of Examples 1-9 to optionally include wherein the tube assembly includes welded and work hardened configurations: in the welded configuration the first and second tubes proximate the respective ends have an end profile different relative to an overall profile of the first and second tubes, and the weld fusion zone is between the weld interface segments, and in the work hardened configuration the respective ends of the first and second tubes having the end profile are deformed relative to the welded configuration to match the overall profile of the first and second tubes, and each of the weld fusion zone, the weld interface segments and the first and second tubes proximate the weld interfaces are work hardened based on the deformation.

Example 11 can include, or can optionally be combined with the subject matter of Examples 1-10 to optionally include wherein the end profile in the welded configuration is larger compared to the overall profile of the first and second tubes.

Example 12 can include, or can optionally be combined with the subject matter of Examples 1-11 to optionally include wherein the weld fusion zone includes one or more of an autogenous weld or a weld filler and resolidified base material.

Example 13 can include, or can optionally be combined with the subject matter of Examples 1-12 to optionally include a tube assembly comprising: at least a first tube and a second tube configured for coupling at respective ends, the first and second tubes each include: a base material having a specified mechanical characteristic, and a graduated weld interface at the respective end; and a work hardened weld assembly coupling the base material of each of the first and second tubes, the work hardened weld assembly includes: a weld bed laterally extending from a bed root to a bed opening, the weld bed includes the graduated weld interfaces of each of the first and second tubes extending from the bed root to the bed opening, a weld fusion zone coupled along the weld bed between the bed root and the bed opening, and wherein the weld fusion zone is work hardened from the bed root to the bed opening, and the weld bed, including the graduated weld interfaces of the first and second tubes, is work hardened between the weld fusion zone and the base material.

Example 14 can include, or can optionally be combined with the subject matter of Examples 1-13 to optionally include wherein the graduated weld interfaces are work hardened continuously from proximate an outer diameter to proximate an inner diameter of the first and second tubes.

Example 15 can include, or can optionally be combined with the subject matter of Examples 1-14 to optionally include wherein the specified mechanical characteristic includes a specified strength, and the work hardened weld assembly, including at least the weld fusion zone and the graduated weld interfaces, includes a work hardened strength proximate to the specified strength of the base material.

Example 16 can include, or can optionally be combined with the subject matter of Examples 1-15 to optionally include wherein the weld fusion zone overlies the graduated weld interfaces and the base material underlies the graduated weld interfaces.

Example 17 can include, or can optionally be combined with the subject matter of Examples 1-16 to optionally include wherein the weld fusion zone extends laterally from the bed root to the bed opening, and the base material proximate the graduated weld interfaces extends laterally from proximate the bed opening toward the bed root, and the graduated weld interfaces are stacked between the weld fusion zone and the base material.

Example 18 can include, or can optionally be combined with the subject matter of Examples 1-17 to optionally include wherein the weld fusion zone includes: a base weld portion extending along the graduated weld interfaces between the bed root and the bed opening, and a weld skirt extending over portions of the first and second tubes proximate the graduated weld interfaces.

Example 19 can include, or can optionally be combined with the subject matter of Examples 1-18 to optionally include wherein the weld skirt extends over at least a portion of the graduated weld interfaces proximate an outer diameter of the first and second tubes.

Example 20 can include, or can optionally be combined with the subject matter of Examples 1-19 to optionally include wherein the work hardened weld assembly includes a tapered weld recess bounded by the weld bed, and the tapered weld recess tapers from the bed opening proximate an outer diameter of the first and second tubes to the bed root proximate an inner diameter of the first and second tubes.

Example 21 can include, or can optionally be combined with the subject matter of Examples 1-20 to optionally include wherein the work hardened weld assembly includes a tapered weld recess bounded by the weld bed, and the tapered weld recess tapers from the bed opening proximate an inner diameter of the first and second tubes to the bed root proximate an outer diameter of the first and second tubes.

Example 22 can include, or can optionally be combined with the subject matter of Examples 1-21 to optionally include wherein the weld bed includes: a weld bed ceiling extending along the weld fusion zone, and a weld bed floor extending along the base material of the respective first and second tubes.

Example 23 can include, or can optionally be combined with the subject matter of Examples 1-22 to optionally include wherein the weld bed, including the graduated weld interfaces, is stacked between the weld fusion zone and the base material.

Example 24 can include, or can optionally be combined with the subject matter of Examples 1-23 to optionally include wherein the weld fusion zone includes one or more of an autogenous weld or a weld filler and resolidified base material.

Example 25 can include, or can optionally be combined with the subject matter of Examples 1-24 to optionally include an umbilical including the tube assembly.

Example 26 can include, or can optionally be combined with the subject matter of Examples 1-25 to optionally include a tube assembly comprising: at least a first tube and a second tube configured for coupling at respective ends, the first and second tubes each include: a base material having a specified mechanical characteristic, and a weld interface at the respective end, the weld interface is proximate to an inner diameter and an outer diameter of the first and second tubes, and includes a weld interface segment extending therebetween; and a weld assembly coupling the base material of each of the first and second tubes, the weld assembly includes at least the weld interface segments, the weld assembly having welded and work hardened configurations: in the welded configuration the first and second tubes proximate the respective ends have an end profile different relative to an overall profile of the first and second tubes, and in the work hardened configuration the respective ends of the first and second tubes having the end profile are deformed relative to the welded configuration, and at least the weld interface segments and the first and second tubes proximate the weld interfaces are work hardened based on the deformation.

Example 27 can include, or can optionally be combined with the subject matter of Examples 1-26 to optionally include wherein the weld interface segments are work hardened continuously from proximate the outer diameter to proximate the inner diameter of the first and second tubes.

Example 28 can include, or can optionally be combined with the subject matter of Examples 1-27 to optionally include wherein the specified mechanical characteristic includes a specified strength, and the weld assembly in the work hardened configuration, including at least the weld interface segments, includes a work hardened strength proximate to the specified strength of the base material.

Example 29 can include, or can optionally be combined with the subject matter of Examples 1-28 to optionally include wherein the weld assembly includes a weld fusion zone between the weld interface segments.

Example 30 can include, or can optionally be combined with the subject matter of Examples 1-29 to optionally include wherein the weld fusion zone includes one or more of an autogenous weld or a weld filler and resolidified base material.

Example 31 can include, or can optionally be combined with the subject matter of Examples 1-30 to optionally include wherein the weld fusion zone includes: a base weld portion extending along the weld interfaces between the inner and outer diameters, and a weld skirt extending over portions of the first and second tubes proximate the weld interfaces.

Example 32 can include, or can optionally be combined with the subject matter of Examples 1-31 to optionally include wherein the weld skirt extends over at least a portion of the of weld interfaces proximate the outer diameter of the first and second tubes.

Example 33 can include, or can optionally be combined with the subject matter of Examples 1-32 to optionally include wherein each of the weld interface segments, the weld fusion zone and the first and second tubes proximate the weld interfaces are work hardened based on the deformation.

Example 34 can include, or can optionally be combined with the subject matter of Examples 1-33 to optionally include wherein the end profile of the first and second tubes proximate the respective ends in the welded configuration is larger than the overall profile of the first and second tubes.

Example 35 can include, or can optionally be combined with the subject matter of Examples 1-34 to optionally include wherein the respective ends of the first and second tubes having the end profile are deformed relative to the welded configuration to match the overall profile of the first and second tubes.

Example 36 can include, or can optionally be combined with the subject matter of Examples 1-35 to optionally include a method for connecting at least first and second tubes comprising: welding first and second tubes, welding includes: filling at least a weld recess bounded by weld interfaces at respective ends of the first and second tubes with a weld fusion zone, the weld interfaces extending from proximate an outer diameter toward an inner diameter of the first and second tubes, and wherein the weld fusion zone in the weld recess is proximate localized heat affected zones in each of the weld interfaces of the first and second tubes; and work hardening a weld assembly including at least the weld fusion zone and the localized heat affected zones of the weld interfaces, work hardening the weld assembly includes: deforming the weld fusion zone at least within the weld recess, and deforming each of the localized heat affected zones with deformation of the weld fusion zone in at least the weld recess, and deforming of each of the weld fusion zone and the localized heat affected zones is at the same time.

Example 37 can include, or can optionally be combined with the subject matter of Examples 1-36 to optionally include wherein deforming each of the localized heat affected zones includes deforming the weld fusion zone overlying the localized heat affected zones.

Example 38 can include, or can optionally be combined with the subject matter of Examples 1-37 to optionally include wherein the localized heat affected zones are between the weld fusion zone and a base material of the first and second tubes, and deforming each of the localized heat affected zones includes deforming the weld fusion zone toward the localized heat affected zones.

Example 39 can include, or can optionally be combined with the subject matter of Examples 1-38 to optionally include wherein work hardening the weld fusion zone and the localized heat affected zones includes supporting the base material of the first and second tubes along the inner diameter of the first and second tubes.

Example 40 can include, or can optionally be combined with the subject matter of Examples 1-39 to optionally include wherein work hardening the weld fusion zone and the localized heat affected zones of the weld interfaces includes work hardening the weld fusion zone and the localized heat affected zones continuously from proximate the outer diameter to proximate the inner diameter.

Example 41 can include, or can optionally be combined with the subject matter of Examples 1-40 to optionally include wherein work hardening the weld fusion zone and the localized heat affected zones of the weld interfaces includes work hardening the weld fusion zone and the localized heat affected zones continuously from the outer diameter to the inner diameter.

Example 42 can include, or can optionally be combined with the subject matter of Examples 1-41 to optionally include wherein the first and second tubes include a base material having a specified strength, and work hardening the weld assembly includes work hardening the weld assembly to a work hardened strength proximate to the specified strength of the base material.

Example 43 can include, or can optionally be combined with the subject matter of Examples 1-42 to optionally include tapering the weld interfaces at the respective ends of the first and second tubes from proximate the outer diameter to proximate the inner diameter, and the weld recess includes a tapered weld recess corresponding to tapering of the weld interfaces.

Example 44 can include, or can optionally be combined with the subject matter of Examples 1-43 to optionally include wherein filling at least the weld recess includes: filling the tapered weld recess with a base weld portion of the weld fusion zone, and covering the weld fusion zone and portions of the first and second tubes proximate the outer diameter with a weld skirt of the weld fusion zone.

Example 45 can include, or can optionally be combined with the subject matter of Examples 1-44 to optionally include wherein deforming the weld fusion zone at least within the weld recess includes deforming the base weld portion and the weld skirt.

Example 46 can include, or can optionally be combined with the subject matter of Examples 1-45 to optionally include wherein the weld skirt extends above the outside diameter of the first and second tubes a specified height, and deforming the base weld portion and the weld skirt includes deforming the weld skirt to a flush configuration relative to the outside diameter from the specified height, and deforming the weld skirt to the flush configuration from the specified height increases the strength of the weld assembly including the weld fusion zone and the localized heat affected zones to a work hardened strength proximate a specified strength of a base material of the first and second tubes.

Example 47 can include, or can optionally be combined with the subject matter of Examples 1-46 to optionally include shaping the weld skirt into a planar configuration having the specified height.

Example 48 can include, or can optionally be combined with the subject matter of Examples 1-47 to optionally include changing an end profile of the respective ends of the first and second tubes relative to an overall profile of the first and second tubes.

Example 49 can include, or can optionally be combined with the subject matter of Examples 1-48 to optionally include wherein work hardening the weld assembly includes deforming the end profile of the first and seconds tubes relative to the changed end profile of the respective ends.

Example 50 can include, or can optionally be combined with the subject matter of Examples 1-49 to optionally include wherein changing the end profile includes compressing or expanding the end profile relative to the overall profile.

Example 51 can include, or can optionally be combined with the subject matter of Examples 1-50 to optionally include an umbilical assembly comprising: a sheath including an interior passage extending through the sheath; a plurality of tube assemblies within the interior passage, each of the tube assemblies includes: at least a first tube and a second tube configured for coupling at respective ends; and a work hardened weld assembly coupling a base material of each of the first and second tubes, the work hardened weld assembly includes: a weld fusion zone between weld interfaces of the first and second tubes, the weld fusion zone extends between inner and outer diameters of the first and second tubes, the weld interfaces of the first and second tubes, and wherein the weld fusion zone is work hardened and at least the weld interfaces of the first and second tubes are work hardened between the work hardened weld fusion zone and the base material of the first and second tubes.

Example 52 can include, or can optionally be combined with the subject matter of Examples 1-51 to optionally include wherein the plurality of tube assemblies includes one or more of flow lines, hydraulic control lines, injection chemical lines, power or data lines or the like.

Example 53 can include, or can optionally be combined with the subject matter of Examples 1-52 to optionally include wherein the work hardened weld assembly, including at least the weld fusion zone and the weld interfaces, includes a work hardened mechanical characteristic proximate to a specified mechanical characteristic of the base material.

Example 54 can include, or can optionally be combined with the subject matter of Examples 1-53 to optionally include wherein each of the work hardened weld assembly and the base material have yield strengths of at least 90,000 psi.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the disclosure can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the disclosure should be determined with reference to the appended claims, along with the full scope of equivalents to which such claims are entitled.

The claimed invention is:

1. A service tube assembly comprising:
one or more service tubes, the one or more service tubes each include at least a first tube and a second tube, each of the first and second tubes having:
a base material having a specified mechanical characteristic; and
a weld interface proximate an end of each respective tube;
at least one of the one or more service tubes includes one or more work hardened weld assemblies joining the first and second tubes at the respective ends; and
wherein the work hardened weld assembly includes:
a weld fusion zone between the weld interfaces of the first and second tubes;

the weld interfaces of the first and second tubes; and
wherein the tube assembly includes welded and work hardened configurations:
in the welded configuration the weld interfaces are stacked between the weld fusion zone and the base material of the respective first or second tubes; and
in the work hardened configuration the weld fusion zone and the weld interfaces are deformed into the base material, the weld interfaces are deformed between the stacked weld fusion zone and the base material of the first and second tubes, and the weld fusion zone is work hardened and the weld interfaces of the first and second tubes are work hardened between the work hardened weld fusion zone and the base material of the first and second tubes according to the deformation.

2. The service tube assembly of claim 1, wherein the one or more service tubes include a plurality of service tubes; the service tube assembly includes an umbilical; and
the umbilical comprising:
the plurality of service tubes, and at least one of the service tubes of the plurality of service tubes includes the work hardened weld assembly; and
a sheath extending around the plurality of service tubes.

3. The service tube assembly of claim 1, wherein the one or more service tubes include two or more service tubes, and at least one of the two or more service tubes includes the work hardened weld assembly; and
the service tube assembly comprising a sheath extending around the two or more service tubes.

4. The service tube assembly of claim 3, wherein the single service tube includes a hydraulic control line, a work string, a velocity string, or a capillary tube.

5. The service tube assembly of claim 1, wherein the one or more service tubes include a single service tube.

6. The service tube assembly of claim 1, wherein the weld fusion zone extends between inner and outer diameters of the first and second tubes.

7. The service tube assembly of claim 6, wherein the weld interfaces are work hardened continuously from proximate the outer diameter to proximate the inner diameter of the first and second tubes.

8. The service tube assembly of claim 1, wherein the weld interfaces include a heat affected bead in the work hardened configuration.

9. The service tube assembly of claim 1, wherein in the welded configuration localized heat affected zones are present in the weld interfaces; and
in the work hardened configuration localized heat affected zones are decreased in the weld interfaces according to the deformation relative to the welded configuration.

10. The service tube assembly of claim 1, wherein the specified mechanical characteristic of the base material includes a specified strength, and the work hardened weld assembly, including at least the weld fusion zone and the weld interfaces, includes a work hardened strength proximate to the specified strength of the base material.

11. The service tube assembly of claim 1, wherein the weld fusion zone includes:
a base weld portion extending along the weld interfaces between inner and outer diameters of the first and second tubes; and
a weld skirt extending over portions of the first and second tubes proximate the weld interfaces.

12. The service tube assembly of claim 1, wherein the work hardened weld assembly includes a tapered weld recess bounded by the weld interfaces, and the tapered weld recess tapers from a recess opening proximate to outer diameters of the first and second tubes to a recess root of the first and second tubes proximate to inner diameters of the first and second tubes.

13. The service tube assembly of claim 1, wherein the weld interfaces are included in a weld bed extending laterally from proximate inner diameters of the first and second tubes to proximate outer diameters of the first and second tubes, the weld bed includes:
a weld bed ceiling extending along the weld fusion zone; and
a weld bed floor extending along the base material of the respective first and second tubes.

14. The service tube assembly of claim 1, wherein the weld fusion zone includes one or more of an autogenous weld or a weld filler and resolidified base material.

15. The service tube assembly of claim 1,
wherein in the welded configuration the first and second tubes proximate the respective ends have an end profile different relative to an overall profile of the first and second tubes; and
wherein in the work hardened configuration the respective ends of the first and second tubes having the end profile are deformed relative to the welded configuration to match the overall profile of the first and second tubes, and the weld fusion zone and the weld interfaces are work hardened according to the deformation.

16. The service tube assembly of claim 1, wherein in the work hardened configuration the weld fusion zone and the weld interfaces are, relative to the welded configuration, plastically deformed toward the base material and transverse to the stack of the weld interfaces, the weld fusion zone and the base material.

17. A service tube assembly comprising:
one or more service tubes, the one or more service tubes each include at least a first tube and a second tube, each of the first and second tubes having:
a base material having a specified mechanical characteristic; and
a weld interface proximate an end of each of the first and second tubes;
at least one of the one or more service tubes includes one or more work hardened weld assemblies joining the first and second tubes at the respective ends; and
wherein the work hardened weld assembly includes:
a weld fusion zone between the weld interfaces of the first and second tubes;
the weld interfaces of the first and second tubes; and
wherein the tube assembly includes welded and work hardened configurations:
in the welded configuration the first and second tubes proximate the respective ends have an end profile different relative to an overall profile of the first and second tubes, the weld interfaces are stacked between the weld fusion zone and the base material of the respective first or second tubes; and
in the work hardened configuration the respective ends of the first and second tubes having the end profile are deformed relative to the welded configuration to match the overall profile of the first and second tubes, the weld fusion zone and the weld interfaces are deformed into the base material, the weld interfaces are deformed between the stacked weld fusion zone and the base material of the first and second tubes, and the weld fusion zone is work hardened and the weld interfaces of the first and second tubes are work hardened between the work hardened weld fusion zone and the base material of the first and second tubes based on the deformation.

18. The service tube assembly of claim 17, wherein the one or more service tubes include a plurality of service tubes;
the service tube assembly includes an umbilical; and
the umbilical comprising:
the plurality of service tubes, and at least one of the service tubes of the plurality of service tubes includes the work hardened weld assembly; and
a sheath extending around the plurality of service tubes.

19. The service tube assembly of claim 17, wherein the one or more service tubes include two or more service tubes, and at least one of the two or more service tubes includes the work hardened weld assembly; and
the service tube assembly comprising a sheath extending around the two or more service tubes.

20. The service tube assembly of claim 17, wherein the one or more service tubes include a single service tube.

21. The service tube assembly of claim 20, wherein the single service tube includes a hydraulic control line, a work string, a velocity string, or a capillary tube.

22. The service tube assembly of claim 17, wherein the end profiles of the first and second tubes in the welded configuration are larger compared to the overall profiles of the first and second tubes.

23. The service tube assembly of claim 17, wherein the weld fusion zone extends between inner and outer diameters of the first and second tubes.

24. The service tube assembly of claim 23, wherein the weld interfaces are work hardened continuously from proximate the outer diameter to proximate the inner diameter of the first and second tubes.

25. The service tube assembly of claim 17, wherein in the welded configuration localized heat affected zones are present in the weld interfaces; and
in the work hardened configuration localized heat affected zones are absent in the weld interfaces according to the deformation.

26. The service tube assembly of claim 17, wherein the specified mechanical characteristic of the base material includes a specified strength, and the work hardened weld assembly, including at least the weld fusion zone and the weld interfaces, includes a work hardened strength proximate to the specified strength of the base material.

27. The service tube assembly of claim 17, wherein the work hardened weld assembly includes a tapered weld recess bounded by the weld interfaces, and the tapered weld recess tapers from a recess opening proximate to outer diameters of the first and second tubes to a recess root of the first and second tubes proximate to inner diameters of the first and second tubes.

28. The service tube assembly of claim 17, wherein the weld interfaces are included in a weld bed extending laterally from proximate inner diameters of the first and second tubes to proximate outer diameters of the first and second tubes, the weld bed includes:
a weld bed ceiling extending along the weld fusion zone; and
a weld bed floor extending along the base material of the respective first and second tubes.

29. The service tube assembly of claim 17, wherein the weld fusion zone includes one or more of an autogenous weld or a weld filler and resolidified base material.

30. A method of making a service tube assembly comprising:
welding one or more service tubes of the service tube assembly, welding the one or more service tubes includes:
fusing ends of first and second tubes at weld interfaces proximate the ends with a weld assembly including the weld interfaces and a weld fusion zone; and
wherein the weld interfaces are stacked between the weld fusion zone and base material of the first and second tubes;
work hardening the weld assemblies of the one or more service tubes including:
deforming the weld fusion zone and the weld interfaces into the base material;
deforming the weld interfaces between the stacked weld fusion zone and the base material; and
wherein the weld fusion zone and the weld interfaces are work hardened according to the deforming;
bundling a plurality of service tubes, including the one or more service tubes, together; and
positioning the bundled plurality of service tubes within at least one sheath.

31. The method of making the service tube assembly of claim 30, wherein deforming the weld fusion zone and the weld interfaces and deforming the weld interfaces between the stacked weld fusion zone and the base material includes deforming in a transverse direction relative to the stacked weld interfaces, weld fusion zone and base material.

32. The method of making the service tube assembly of claim 30, wherein deforming the weld fusion zone and the weld interfaces and deforming the weld interfaces between the stacked weld fusion zone and the base material includes deforming end profiles of the first and second tubes proximate the respective ends to match overall profiles of the first and second tubes.

33. The method of making the service tube assembly of claim 30, wherein deforming the weld fusion zone and the weld interfaces and deforming the weld interfaces between the stacked weld fusion zone and the base material includes changing end profiles of the first and second tubes proximate the respective ends to match overall profiles of the first and second tubes.

34. The method of claim 33, wherein changing the end profiles includes compressing or expanding the end profiles to match the overall profiles.

35. The method of making the service tube assembly of claim 30, wherein deforming the weld fusion zone and the weld interfaces and deforming the weld interfaces between the stacked weld fusion zone and the base material includes deforming the weld interfaces continuously from proximate inner diameters to proximate outer diameters of the first and second tubes.

36. The method of claim 30, wherein the weld interfaces include localized heat affected zones; and
deforming the weld fusion zone and the weld interfaces and deforming the weld interfaces between the stacked weld fusion zone and the base material includes reducing localized heat affected zones of each of the weld fusion zone and the weld interfaces.

37. The method of claim 36, wherein deforming the weld fusion zone and the weld interfaces and deforming the weld interfaces between the stacked weld fusion zone and the base material includes work hardening the localized heat affected zones continuously from proximate outer diameters to proximate inner diameters of the first and second tubes.

38. The method of claim 30, wherein the base material of the first and second tubes includes a specified strength; and
deforming the weld fusion zone and the weld interfaces and deforming the weld interfaces between the stacked weld fusion zone and the base material includes work hardening the weld assembly to a work hardened strength proximate to the specified strength of the base material.

39. The method of claim 30 comprising forming an umbilical including the bundled plurality of service tubes, the weld assembly and the at least one sheath; and
wherein forming the umbilical includes welding the one or more service tubes, bundling the plurality of service tubes and positioning the bundled plurality of service tubes within the at least one sheath.

40. The method of claim 30, wherein deforming the weld fusion zone and the weld interfaces into the base material and deforming the weld interfaces between the stacked weld fusion zone and the base material includes deforming the weld fusion zone and the weld interfaces toward the base material and transverse to the stack of the weld interfaces, the weld fusion zone and the base material.

\* \* \* \* \*